(12) United States Patent
Koumura

(10) Patent No.: US 10,703,160 B2
(45) Date of Patent: Jul. 7, 2020

(54) ROLL CONTROL APPARATUS FOR VEHICLE

(71) Applicant: TOYOTA JIDOSHA KABUSHIKI KAISHA, Toyota-shi, Aichi (JP)

(72) Inventor: Shingo Koumura, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 246 days.

(21) Appl. No.: 15/941,842

(22) Filed: Mar. 30, 2018

(65) Prior Publication Data

US 2018/0281547 A1 Oct. 4, 2018

(30) Foreign Application Priority Data

Apr. 3, 2017 (JP) .................................. 2017-073490

(51) Int. Cl.
| | |
|---|---|
| *B60G 17/016* | (2006.01) |
| *B60G 17/018* | (2006.01) |
| *B60G 17/015* | (2006.01) |
| *B60G 21/055* | (2006.01) |

(52) U.S. Cl.
CPC ....... *B60G 17/0162* (2013.01); *B60G 17/018* (2013.01); *B60G 17/0157* (2013.01); *B60G 21/055* (2013.01); *B60G 2202/135* (2013.01); *B60G 2202/42* (2013.01); *B60G 2204/82* (2013.01); *B60G 2300/60* (2013.01); *B60G 2400/0511* (2013.01); *B60G 2400/0521* (2013.01); *B60G 2400/204* (2013.01);

(Continued)

(58) Field of Classification Search
CPC .............. B60G 17/0162; B60G 21/055; B60G 17/0157; B60G 17/018; B60G 2202/135; B60G 2400/204; B60G 2400/0521; B60G 2400/0511; B60G 2600/182; B60G 2300/60; B60G 2600/17; B60G 2800/012; B60G 2204/82; B60G 2202/42
See application file for complete search history.

(56) References Cited

U.S. PATENT DOCUMENTS

| | | | | | |
|---|---|---|---|---|---|
| 4,865,347 | A | * | 9/1989 | Fukushima | ........ B60G 17/0162 |
| | | | | | 280/5.508 |
| 6,526,342 | B1 | * | 2/2003 | Burdock | .............. B60G 17/015 |
| | | | | | 280/5.5 |

(Continued)

FOREIGN PATENT DOCUMENTS

| | | | | | |
|---|---|---|---|---|---|
| JP | 2005-225301 | | * | 8/2005 | ......... B60G 17/0162 |
| JP | 2007-245887 | A | | 9/2007 | |
| JP | 2009-096366 | | * | 5/2009 | ......... B60G 17/0165 |

*Primary Examiner* — Frank B Vanaman
(74) *Attorney, Agent, or Firm* — Oliff PLC

(57) ABSTRACT

A roll control apparatus for a vehicle which comprises front wheel side and rear wheel side active stabilizer devices and a control unit that is configured to control the stabilizer devices, to calculate a target anti-roll moment, to determine optimum control gains of electric actuators of the stabilizer devices among pre-stored control gains based on a vehicle speed and a frequency of change in a roll angle of a vehicle body, and to control the electric actuators so that a sum of anti-roll moments generated by the front wheel side and rear wheel side active stabilizer devices becomes the target anti-roll moment and control gains of the electric actuators become the optimum control gains.

7 Claims, 28 Drawing Sheets

(52) U.S. Cl.
CPC .... *B60G 2600/17* (2013.01); *B60G 2600/182* (2013.01); *B60G 2800/012* (2013.01)

(56) References Cited

U.S. PATENT DOCUMENTS

| | | | |
|---|---|---|---|
| 2005/0023789 A1* | 2/2005 | Suzuki | B60G 17/0162 280/124.106 |
| 2005/0131604 A1* | 6/2005 | Lu | B60G 17/0162 701/38 |
| 2010/0013174 A1* | 1/2010 | Buma | B60G 17/0157 280/5.507 |
| 2013/0297152 A1* | 11/2013 | Hayashi | B60G 17/015 701/42 |
| 2018/0178610 A1* | 6/2018 | Fujita | B60G 17/0165 |

* cited by examiner

ROLL CONTROL APPARATUS FOR VEHICLE

CROSS-REFERENCE TO RELATED APPLICATION

The disclosure of Japanese Patent Application NO. JP2017-73490 filed on Apr. 3, 2017 is incorporated by reference in its entirety.

BACKGROUND

1. Technical Field

The present disclosure relates to a roll control apparatus for a vehicle including front wheel side and rear wheel side active stabilizer devices.

2. Description of the Prior Art

An active stabilizer device for a vehicle such as an automobile includes left and right stabilizers that each include a bar extending in the lateral direction of the vehicle and an arm portion integrally formed with the bar and extending in a direction crossing the bar, and an electric actuator that relatively rotates the bars of the right and left stabilizers. The bars are rotatably supported by a vehicle body, and distal end portions of the arm portions are connected to corresponding suspension members. The actuator includes an electric motor and a reduction gear, and a relative rotation angle of the bars of the left and right stabilizers caused by the actuator, that is, a rotation angle of the actuator is controlled by an electronic control unit.

In a roll control apparatus using an active stabilizer device, as described, for example, in Japanese Patent Application Laid-open No. 2007-245887, it is known to calculate a target anti-roll moment for reducing a roll angle of a vehicle body (sprung member) on the basis of a product of a roll angular velocity of the vehicle body and a control coefficient. In particular, in a roll control apparatus for a vehicle having front wheel side and rear wheel side active stabilizer devices, two active stabilizer devices are controlled so that a sum of anti-roll moments generated by the active stabilizer devices becomes the target anti-roll moment.

A product of a roll angular velocity of a vehicle body and a gain is a value corresponding to a roll moment of the vehicle body. Therefore, according to the roll control apparatus having the above configuration, it is possible to effectively reduce a roll angle of the vehicle body by anti-roll moments generated by the front wheel side and rear wheel side active stabilizer devices.

In a conventional roll control apparatus, energy consumed by an active stabilizer device is not considered, and a gain (hereinafter referred to as "control gain") of rotation angles of the front wheel side and the rear wheel side actuators with respect to a roll angular velocity of a vehicle body is set to a constant value. However, as will be described in detail later, it has been found that an optimum control gain for reducing energy consumption by each active stabilizer devices varies depending on the front wheel side and rear wheel side actuators, and also varies depending on a vehicle speed and a frequency of a roll angle change of the vehicle body. Therefore, in order to reduce the energy consumption by the active stabilizer devices, it is preferable that a relationship between a vehicle speed and a frequency of change in a roll angle of the vehicle body and optimum control gains is previously obtained for the front wheel side and rear wheel side actuators and control gains are controlled based on the relationship.

SUMMARY

The present disclosure provides a vehicle that is equipped with front wheel side and rear wheel side active stabilizer devices and is improved to reduce energy consumption by the active stabilizer devices as compared with the prior art by controlling control gains based on a relationship previously obtained as described above.

According to the present disclosure, a roll control apparatus for a vehicle is provided which comprises a front wheel side active stabilizer device, a rear wheel side active stabilizer device, and a control unit that controls the front wheel side and rear wheel side active stabilizer devices; each of the active stabilizer devices includes left and right stabilizers each including a bar extending in a lateral direction of the vehicle and an arm portion integrally formed with the bar and extending in a direction crossing the bar, and an electric actuator configured to rotate the bars of the right and left stabilizers relative to each other; the control unit is configured to calculate a target anti-roll moment for reducing a roll angle of a vehicle body based on a product of a roll angular velocity of the vehicle body and a control coefficient, and to control the front wheel side and rear wheel side electric actuators so that a sum of anti-roll moments generated by the front wheel side and rear wheel side active stabilizer devices becomes the target anti-roll moment.

The control unit stores a relationship between optimum control gains of the front wheel side and rear wheel side electric actuators for minimizing an evaluation function based on powers of the front wheel side and rear wheel side active stabilizer devices, a vehicle speed and a frequency of a roll angle change of the vehicle body, the powers of the front wheel side and rear wheel side active stabilizer devices being assumed as products of rotational angular velocities of the front wheel side and rear wheel side electric actuators and stabilizer reaction forces generated by elastic deformation of the corresponding arm portions.

The control unit is configured to determine optimum control gains of the front wheel side and rear wheel side electric actuators from the stored relationship on the basis of a vehicle speed and a frequency of a roll angle change of the vehicle body, and to control the front wheel side and rear wheel side electric actuators so that control gains of the front wheel side and rear wheel side electric actuators become the determined corresponding optimum control gains.

According to the above configuration, are stored relationships between optimum control gains of the electric the front wheel side and on the rear wheel side actuators for minimizing an evaluation function based on the powers of the front wheel side and rear wheel side active stabilizer devices, a vehicle speed and a frequency of a roll angle change of the vehicle body. Optimum control gains of the front wheel side and rear wheel side electric actuators are determined from the stored relationships based on a vehicle speed and a frequency of change in a roll angle of the vehicle body. Furthermore, the front wheel side and rear wheel side electric actuators are controlled so that control gains of the front wheel side and rear wheel side electric actuators become the determined corresponding optimum control gains.

Therefore, not only a sum of the anti-roll moments generated by the front wheel side and the rear wheel side active stabilizer devices can be made the target anti-roll moment but also powers related to the two active stabilizer devices are minimized by minimizing the evaluation function. Accordingly, it is possible to effectively reduce a roll angle of the vehicle body by anti-roll moments generated by the front wheel side and rear wheel side active stabilizer devices, and, in addition, to reduce energy consumption of the front wheel side and rear wheel side active stabilizer devices as compared with the prior art.

In one aspect of the present disclosure, the evaluation function is an average power based on a sum of powers of the front wheel side and rear wheel side active stabilizer devices.

According to the above aspect, since an average power based on a sum of powers of the front wheel side and rear wheel side active stabilizer devices can be minimized, the energy consumption by both of the front wheel side and rear wheel side active stabilizer devices can be reduced as compared with the prior art, which enables to improve fuel economy of the vehicle.

In another aspect of the present disclosure, the evaluation function is a maximum value of a sum of powers of the front wheel side and rear wheel side active stabilizer devices.

According to the above aspect, a maximum value of a sum of powers of the front wheel side and rear wheel side active stabilizer devices can be minimized so that a peak value of energy consumption by both of the front wheel side and rear wheel side active stabilizer devices can be lowered.

In another aspect of the present disclosure, the evaluation function is a larger value of average powers of the front wheel side and rear wheel side active stabilizer devices.

According to the above aspect, a larger value of average powers of the front wheel side and rear wheel side active stabilizer devices can be minimized. Therefore, a larger value of average powers of the front wheel side and rear wheel side active stabilizer devices can be lowered, which enables to reduce a risk of thermal damage (adverse effect due to heat generation) of the actuators.

In another aspect of the present disclosure, the evaluation function is a larger value of maximum values of powers of the front wheel side and rear wheel side active stabilizer devices.

According to the above aspect, a larger one of maximum values of powers of the front wheel side and rear wheel side active stabilizer devices can be minimized so that a larger value of peak values of energy consumption of the front wheel side and rear wheel side active stabilizer devices can be lowered.

In another aspect of the present disclosure, the control unit is configured to perform regeneration to recover generated energy in a situation where an actuator is rotated by a roll of the vehicle to generate electricity, and to set a power of the corresponding active stabilizer device to a negative value when performing regeneration.

According to the above aspect, when regeneration is performed, a power of the corresponding active stabilizer device is set to a negative value. Therefore, powers of the front wheel side and rear wheel side active stabilizer devices can properly be calculated, as compared to where a power of the corresponding active stabilizer device is not set to a negative value even when regeneration is performed.

In another aspect of the present disclosure, the control unit is configured not to recover generated energy even in a situation where an actuator is rotated by a roll of the vehicle to generate electricity, and to set power of the stabilizer device to zero in a situation where the actuator is rotated by a roll of the vehicle.

According to the above aspect, regeneration is not performed and in the situation where an actuator is rotated by a roll of the vehicle, a power of the active stabilizer device is set to zero. Therefore, even in a vehicle in which regeneration is not performed, the powers of the front wheel side and rear wheel side active stabilizer devices can appropriately be calculated.

Other objects, other features and attendant advantages of the present disclosure will be readily understood from the description of the embodiments of the present disclosure described with reference to the following drawings.

DETAILED DESCRIPTION

Principle of the Present Disclosure Adopted in Embodiments

Prior to describing embodiments, the principle of the roll control for a vehicle in the present disclosure will be described with reference to FIGS. 3 to 6 so as to facilitate understanding of the present disclosure.

Figure 3:
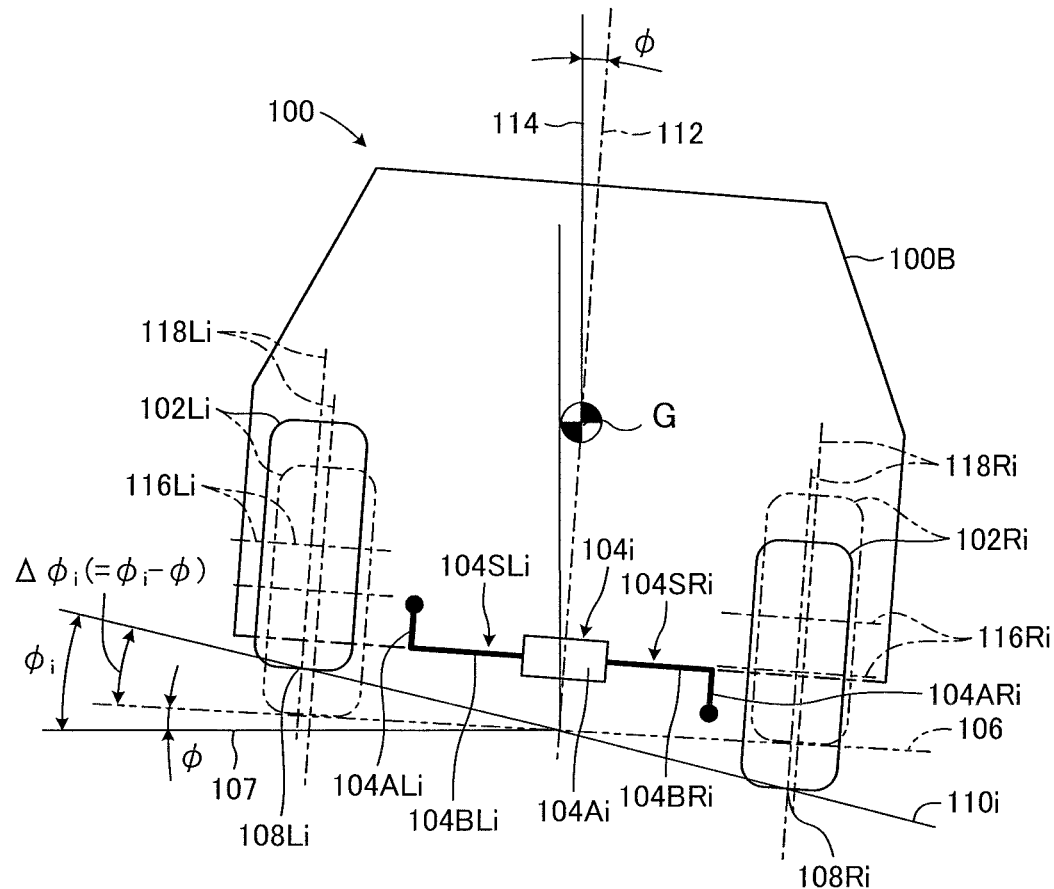
FIG. 3 is a schematic rear view of a vehicle for explaining the principle of roll control of a vehicle in the present disclosure.

In FIG. 3, a vehicle 100 includes active stabilizer devices 104$i$ disposed between a left wheel 102Li and a right wheel 102Ri. Notably, i is f for front wheels and r for rear wheels. Each of the active stabilizer devices 104$i$ has left and right stabilizers 104SLi and 104SRi including bars 104BLi and 104BRi that extend in a lateral direction of the vehicle and arm portions 104ALi and 104ARi that are integral with the bars 104BLi and 104Bri, respectively and extend in the direction crossing the bars. Furthermore, each of the active stabilizer devices 104$i$ has an electric actuator 104Ai that relatively rotates the bars of the left and right stabilizers. Although not shown in FIG. 3, the electric actuators 104Ai each include an electric motor and a reduction gear.

It is assumed that although not shown in FIG. 3, the arm portions 104ALi and 104ARi are connected to suspension members of the left wheel 102 Li and the right wheel 102Ri at the front ends, respectively, and when the wheels neither bound nor rebound, they extend horizontally. Furthermore, it is assumed that rigidity of the bars 104BLi and 104BRi is infinite, and when the wheels bound and rebound, the arms 104ALi and 104ARi are elastically flexurally deformed.

A road surface 106 of a traveling road is inclined downward to the right with respect to the horizontal direction 107 by an angle $\varphi$ and a vehicle body 100B of the vehicle 100 travels while being rolled to the right by $\varphi$ in accordance with the inclination of the road surface 106. The left wheel 102Li and the right wheel 102Ri are bound and rebound, respectively due to unevenness of the road surface 106 and the like which are not shown in FIG. 3. Assuming that an angle formed by a straight line 110$i$ connecting a grounding point 108Li of the left wheel 102Li and a grounding point 108Ri of the right wheel 102Ri with the horizontal direction 107 is $\varphi i$, an inclination angle $\Delta\varphi i$ of the straight line 110$i$ with respect to the road surface 106 (hereinafter referred to as "relative roll angle") is $\varphi i$-$\varphi$.

In FIG. 3, G indicates a center of gravity of the vehicle 100, 112 indicates a center vertical plane of the vehicle 100, and a straight line 114 indicates the vertical direction. Further, reference symbols 116Li and 116Ri denote rotational axes of the left wheel 102Li and the right wheel 102Ri, and 118Li and 118Ri denote center planes of the left wheel 102Li and the right wheel 102Ri, respectively.

Figure 4:
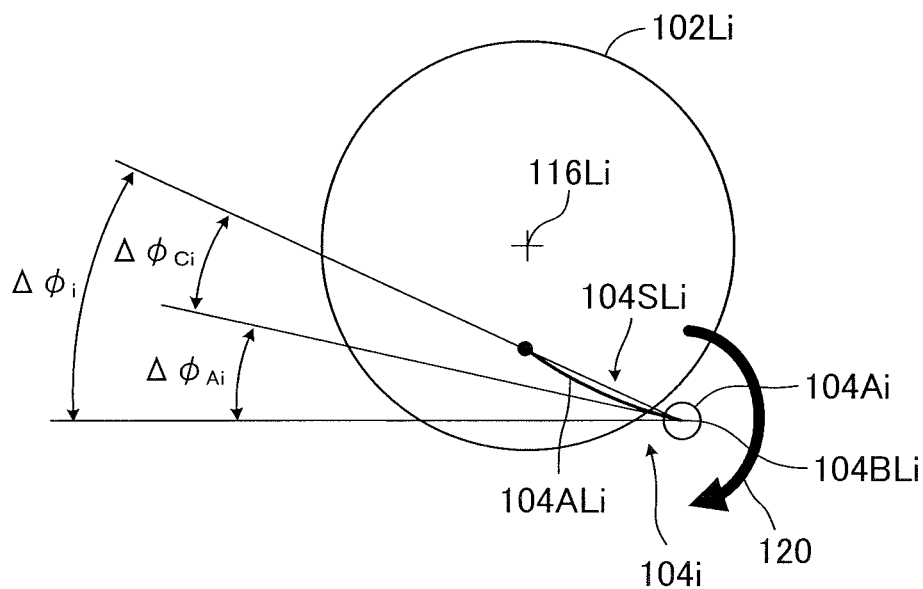
FIG. 4 is a side view showing a active stabilizer device for a wheel in a bouncing state.

In FIG. 4, $\Delta\varphi_{Ai}$ represents a rotation angle of the electric actuator 104Ai, and $\Delta\varphi_{Ci}$ represents a torsion angle of the stabilizer 104SLi due to an elastic bending deformation of the arm portion 104ALi of the stabilizer 104SLi on the side of the left wheel 102Li. Therefore, since a rotation angle $\Delta\varphi$i of the tip of the arm portion 104ALi with respect to the bar 104BLi of the stabilizer 104SLi is $\Delta\varphi_{Ai}+\Delta\varphi_{Ci}$, the following equations (1) and (2) are established. Notably, an arrow 120 indicates a direction in which an elastic bending deformation force of the arm portion 104ALi attempts to rotate the electric actuator 104Ai.

$$\Delta\varphi_f = \Delta\varphi_{Af} + \Delta\varphi_{Cf} \quad (1)$$

$$\Delta\varphi_r = \Delta\varphi_{Ar} + \Delta\varphi_{Cr} \quad (2)$$

As described in the aforementioned Japanese Patent Application Laid-open No. 2007-245887, assuming that a roll angular velocity of the vehicle body is $\varphi$d and a control coefficient is C (a positive constant), a target anti-roll moment Mart for reducing a roll of the vehicle body is expressed by the following equation (3).

$$Mart = -C \cdot \varphi d \quad (3)$$

It is assumed that a spring constant of elastic bending deformation of the arm portions 104ALf and 104ARf of the front wheel side active stabilizer device 104$f$ is Kf and a spring constant of elastic bending deformation of the arm portions 104ALr and 104ARr of the rear wheel side active stabilizer device 104$r$ is Kr. An anti-roll moment Mar generated by controlling the electric actuators 104Af and 104Ar of the front-wheel-side active stabilizer device 104$f$ and the rear wheel-side active stabilizer device 104$r$ is expressed by the following equation (4).

$$Mar = Kf \cdot \Delta\varphi_{Af} + Kr \cdot \Delta\varphi_{Ar} \quad (4)$$

In the conventional rolling control of the vehicle, the electric actuators 104Af and 104Ar are controlled so that an anti-roll moment Mar represented by the equation (4) conforms to the target anti-roll moment Mad represented by the equation (3), that is, the following equation (5) is established. In this case, a gain of a rotation angle $\Delta\varphi_{Ai}$ of the actuator 104Ai with respect to a roll angular velocity $\varphi$d of the vehicle body is constant regardless of a vehicle speed, a frequency of rolling vibration of the vehicle body, and the like.

$$Mart = Kf \cdot \Delta\varphi_{Af} + Kr \cdot \Delta\varphi_{Ar} \quad (5)$$

In the present disclosure, an optimum combination of rotation angles $\Delta\varphi_{Af}$ and $\Delta\varphi_{Ar}$ of the actuators 104Af and 104Ar is determined so as to reduce an energy consumption of the front wheel side active stabilizer device 104$f$ and/or the rear wheel side active stabilizer device 104$r$.

Figure 5:
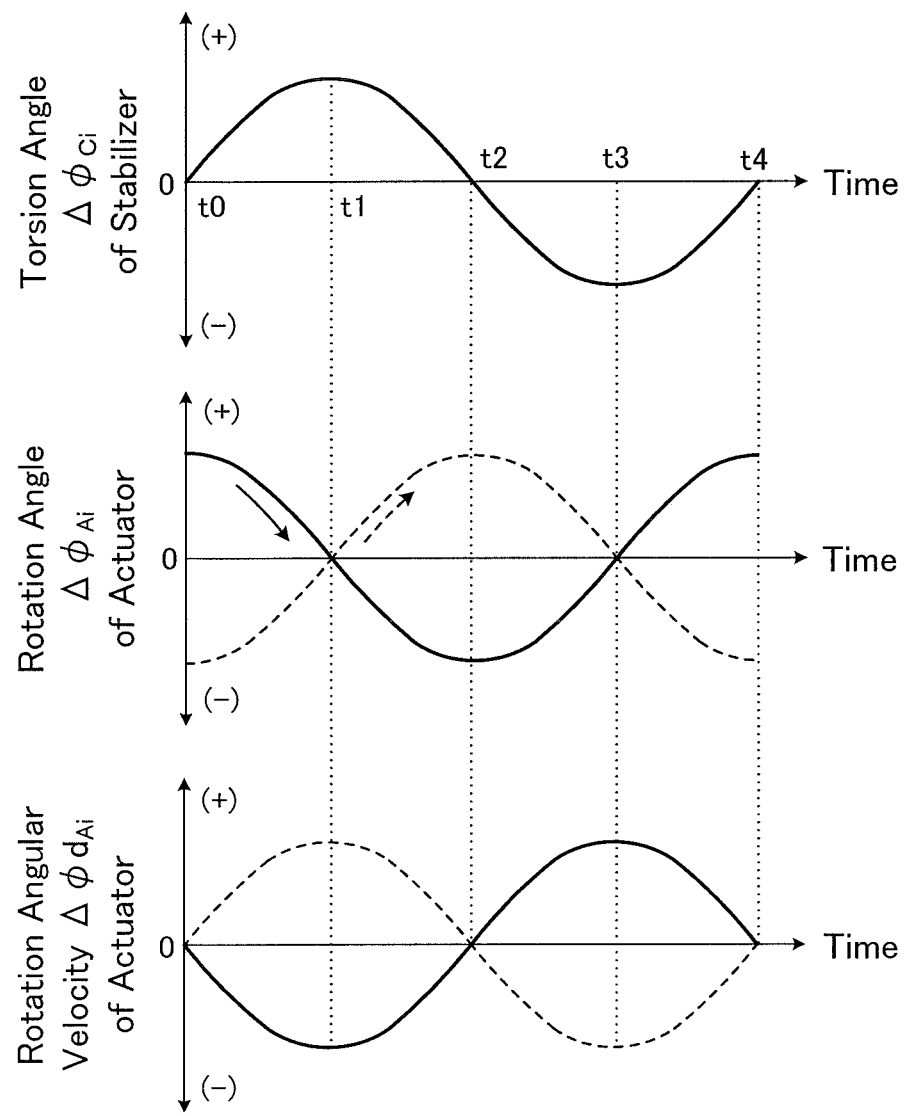
FIG. 5 shows graphs showing a torsion angle $\Delta\varphi_{Ci}$ of the stabilizer (upper part), a rotation angle $\Delta\varphi_{Ai}$ of the actuator (middle part), and a rotational angular velocity $\Delta\varphi d_{Ai}$ of the actuator (lower part).

Consider a case where a torsion angle $\Delta\varphi_{Ci}$ of the stabilizer 104SLi varies as shown in the upper part in FIG. 5 due to elastic bending deformation of the arm portion 104ALi of the stabilizer 104SLi. That is, consider the case where the left wheel 102Li bounces from time point t0 to time point t2 and rebounds from time point t2 to time point t4.

When the rotation angle $\Delta\varphi_{Ai}$ of the actuator 104Ai varies as shown by the solid line in the middle part in FIG. 5, the actuator rotates to lower the left wheel from time point t0 to time point t2, and it rotates to raise the left wheel from time point t2 to time point t4. Therefore, the actuator rotates against the elastic bending deformation of the arm portion 104ALi due to a vertical movement of the left wheel, such that a load of the actuator is large. On the other hand, when the rotation angle $\Delta\varphi_{Ai}$ of the actuator 104Ai varies as indicated by the broken line in the middle part in FIG. 5, the actuator rotates to raise the left wheel from time point t0 to time point t2 and it rotates to lower the left wheel from time point t2 to time point t4. Therefore, the actuator rotates so as to follow the elastic bending deformation of the arm portion 104ALi due to the vertical movement of the left wheel, such that the load of the actuator is small.

The lower part in FIG. 5 shows a time rate $\Delta\varphi_{Ai}$ of change of a rotation angle $\Delta\varphi_{Ai}$ of the actuator 104Ai shown in the middle part in FIG. 5, that is, the rotation angular velocity $\Delta\varphi d_{Ai}$. Although a rotational angular velocity indicated by the solid line is opposite in phase to the torsion angle $\Delta\varphi_{Ci}$ of the stabilizer 104SLi, a rotational angular velocity indicated by the broken line is in phase with the torsion angle $\Delta\varphi_{Ci}$ of the stabilizer 104SLi. Therefore, from FIG. 5, it can be understood that by reducing a phase difference between the torsion angle $\Delta\varphi_{Ci}$ and the rotational angular velocity $\Delta\varphi d_{Ai}$, it is possible to reduce a load of the actuator and to reduce an energy consumption of the active stabilizer device 104$i$.

Next, with reference to FIG. 6, an optimum combination of the rotation angles $\Delta\varphi$Af and $\Delta\varphi$Ar of the actuators 104Af and 104Ar for reducing an energy consumption of the front wheel side active stabilizer device 104$f$ and/or the rear wheel side active stabilizer device 104$r$ will be described.

Figure 6:
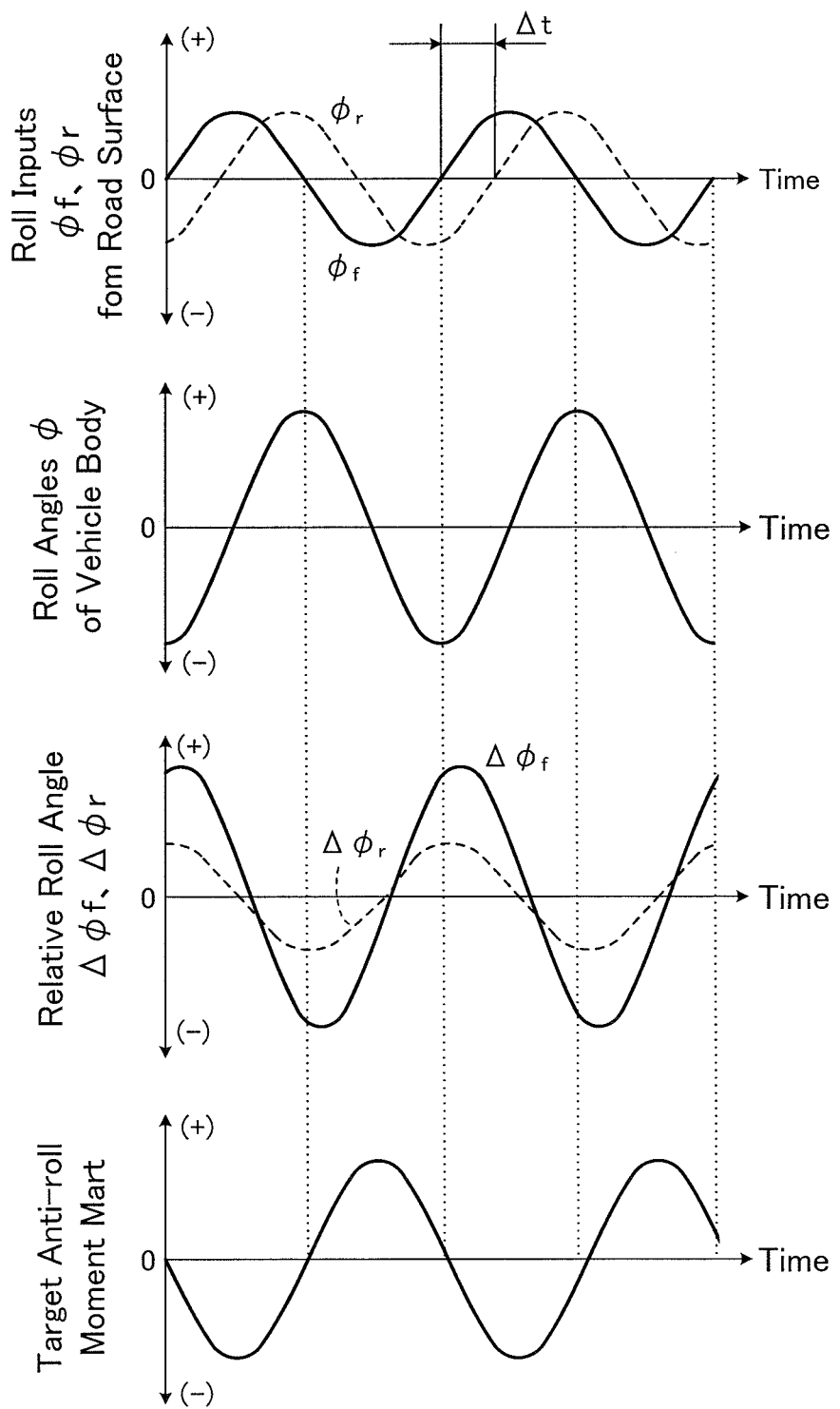
FIG. 6 shows graphs showing roll inputs φf and φr from a road surface to front and rear wheels (the first part), a roll angle φ of a vehicle body (the second part), relative roll angles Δφf and Δφr on the front wheel side and rear wheel side (the third part), and a target anti-roll moment Mart (the fourth part).

As shown in the first part in FIG. 6, a roll input $\varphi$r from a road surface to the rear wheel changes with respect to a roll input $\varphi$f from the road surface to the front wheel with a delay time $\Delta$t determined by a vehicle speed and a wheel base of the vehicle. When a roll angle $\varphi$ of the vehicle body 100B changes as shown in the second part in FIG. 6, the relative roll angles $\Delta\varphi$f and $\Delta\varphi$r on the front wheel side and the rear wheel side change as indicated by the solid line and the broken line in the third part in FIG. 6, respectively. Notably, the fourth part in FIG. 6 shows a change of the target anti-roll moment Mart of the entire vehicle corresponding to a change rate (roll angular velocity $\varphi$d) of the roll angle $\varphi$ of the vehicle body 100B shown in the second part in FIG. 6.

The phases of the relative roll angles $\Delta\varphi$f and $\Delta\varphi$r on the front wheel side and the rear wheel side shown in the third part in FIG. 6 are different from the phase of the target anti-roll moment Mart of the whole vehicle shown in the fourth part in FIG. 6. Therefore, the phases of the torsion angles $\Delta\varphi_{Cf}$ and $\Delta\varphi_{Cr}$, which are parts of the relative roll angles $\Delta\varphi$f and $\Delta\varphi$r, respectively, are different from the phase of the target anti-roll moment Mart. Accordingly, from FIGS. 5 and 6, it can be understood that in order to reduce an energy consumption of the front wheel side and the rear wheel side active stabilizer device, a combination of the rotation angles $\Delta\varphi$Af and $\Delta\varphi$Ar is to be obtained where a phase difference between the torsion angle $\Delta\varphi_{Ci}$ and the rotational angular velocity $\Delta\varphi d_{Ai}$ becomes as small as possible while satisfying the above equations (1) and (2) and the above equation (5).

A consumption energy per unit time, that is, powers Ef and Er of the front wheel side active stabilizer device 104$f$ and the rear wheel side active stabilizer device 104$r$ in the case where regeneration by the electric motor is performed are calculated by the following equations (6) and (7), respectively. That is, the power Ef is calculated as a product of a rotational angular velocity $\Delta\varphi d_{Af}$ ($=d\Delta\varphi_{Af}/dt$) of the electric actuator 104Af and the stabilizer reaction force Kf·$\Delta\varphi_{Cf}$ generated by an elastic deformation of the arm portion 104ALf. Similarly, the power Er is calculated as a product of a rotational angular velocity $\Delta\varphi d_{Ar}$ ($=d\Delta\varphi_{Ar}/dt$) of the electric actuator 104Ar and the stabilizer reaction force Kr·$\Delta\varphi_{Cr}$ generated by an elastic deformation of the arm portion 104ALr. The powers Ef and Er become positive values when the bars of the corresponding stabilizer are rotated relative to each other, and the powers Ef and Er become negative values when the regeneration is performed by the electric motors of the electric actuators being rotated by the corresponding stabilizers.

$$E_f = \left(\frac{d\Delta\phi_{Af}}{dt}\right) \cdot (K_f \Delta\phi_{Cf}) \qquad (6)$$
$$= K_f \frac{d\Delta\phi_{Af}}{dt}(\Delta\phi_f - \Delta\phi_{Af})$$

$$E_r = \left(\frac{d\Delta\phi_{Ar}}{dt}\right) \cdot (K_r \Delta\phi_{Cr}) \qquad (7)$$
$$= K_r \frac{d}{dt}\left(\frac{Mart - K_f \Delta\phi_{Af}}{K_r}\right)\left(\Delta\phi_r - \frac{Mart - K_f \Delta\phi_{Af}}{K_r}\right)$$
$$= \left(\frac{dMart}{dt} - K_f \frac{d\Delta\phi_{Af}}{dt}\right)\left(\Delta\phi_r - \frac{Mart - K_f \Delta\phi_{Af}}{K_r}\right)$$

When the regeneration by the electric motor is not performed, the powers Ef' and Er' of the front wheel side active stabilizer device 104f and the rear wheel side active stabilizer device 104r are the same as Ef and Er, respectively when Ef and Er are positive values. On the other hand, the powers Ef' and Er' are zero when Ef and Er are negative values, respectively.

The evaluation functions EF1 to EF8 expressed by the following expressions (8) to (15) are considered as evaluation functions for reducing energy consumption of the front wheel side active stabilizer device 104f and/or the rear wheel side active stabilizer device 104r. The evaluation functions EF1, EF3, EF5, and EF7 are evaluation functions for the case where regeneration by the motor is performed, and the evaluation functions EF2, EF4, EF6, and EF8 are evaluation functions for the case where regeneration by the electric motor is not performed. In the evaluation functions EF1, EF2, EF5, and EF6, ω is a frequency of a periodic change of the roll angle φ of the vehicle body 100B. MAX in the evaluation functions EF3 to EF8 means a maximum value or a larger value among values in the parenthesis.

$$EF1 = \frac{\omega}{2\pi}\int_{t=0}^{2\pi/\omega}(E_f + E_r)dt \qquad (8)$$

$$EF2 = \frac{\omega}{2\pi}\int_{t=0}^{2\pi/\omega}(E'_f + E'_r)dt \qquad (9)$$

$$EF3 = \text{MAX}(E_f + E_r) \qquad (10)$$

$$EF4 = \text{MAX}(E'_f + E'_r) \qquad (11)$$

$$EF5 = \text{MAX}\left[\frac{\omega}{2}\int_{t=0}^{2\pi/\omega} E_f dt, \frac{\omega}{2}\int_{t=0}^{2\pi/\omega} E_r dt\right] \qquad (12)$$

$$EF6 = \text{MAX}\left[\frac{\omega}{2}\int_{t=0}^{2\pi/\omega} E'_f dt, \frac{\omega}{2}\int_{t=0}^{2\pi/\omega} E'_r dt\right] \qquad (13)$$

$$EF7 = \text{MAX}[\text{MAX}(E_f), \text{MAX}(E_r)] \qquad (14)$$

$$EF8 = \text{MAX}[\text{MAX}(E'_f), \text{MAX}(E'_r)] \qquad (15)$$

The evaluation functions EF1 and EF2 are evaluation functions for the average power based on a sum of the powers of the front wheel side and rear wheel side active stabilizer devices. As these value are smaller, energy consumption of both the front wheel side and rear wheel side active stabilizer devices is smaller, and a fuel economy of the vehicle is better. The evaluation functions EF3 and EF4 are evaluation functions for a maximum value of a sum of the powers of the front wheel side and the rear wheel side active stabilizer devices. As these values are smaller, a peak value of the energy consumption of both the front wheel side and the rear wheel side active stabilizer devices is lower.

Evaluation functions EF6 and EF6 are evaluation functions for a larger value of average powers of the front wheel side and the rear wheel side active stabilizer devices. As these value are smaller, a heat damage of the actuators 104Ai is less. The evaluation functions EF7 and EF8 are evaluation functions for the larger one of the maximum values of powers of the front wheel side and the rear wheel side active stabilizer devices. As these values are smaller, the larger one of the peak values of energy consumption of the front wheel side and the rear wheel side active stabilizer devices is lower.

It is assumed that gains of rotation angles $\Delta\varphi_{Af}$ and $\Delta\varphi_{Ar}$ of the actuators 104Af and 104Ar with respect to a roll angular velocity φd of the vehicle body are control gains Gf and Gr, respectively. If the control gains Gf and Gr when the respective evaluation functions are minimized are previously obtained as optimum control gains Gft and Grt, respectively and the front wheel side and the rear wheel side active stabilizer devices are controlled based on the optimum control gains, energy consumption can be reduced. The optimum control gains Gft and Grt differ depending on the frequency ω of a periodic change of a roll angle φ of the vehicle body 100B, a vehicle speed, and specifications of the vehicle.

Therefore, optimum control gains Oft and Grt may be obtained in advance by simulation or experimentally, for example, for the specifications of the vehicle to which the present disclosure is applied, a plurality of vehicle speed ranges and various frequencies ω and maps of the optimum control gains Oft and Grt with a frequency ω as a parameter may be set for each of a plurality of vehicle speed ranges. Further, in carrying out the roll control of the vehicle according to the present disclosure, a map may be specified by specifying a vehicle speed range on the basis of a vehicle speed, and by referring to the map specified on the basis of a frequency ω, optimum control gain Oft and Grt may be determined, and the front wheel side and rear wheel side active stabilizer devices may be controlled based on these control gains.

Next, first to eighth embodiments of the roll control apparatus according to the present disclosure configured based on the above-mentioned principle will be described in detail.

First Embodiment

Figure 1:
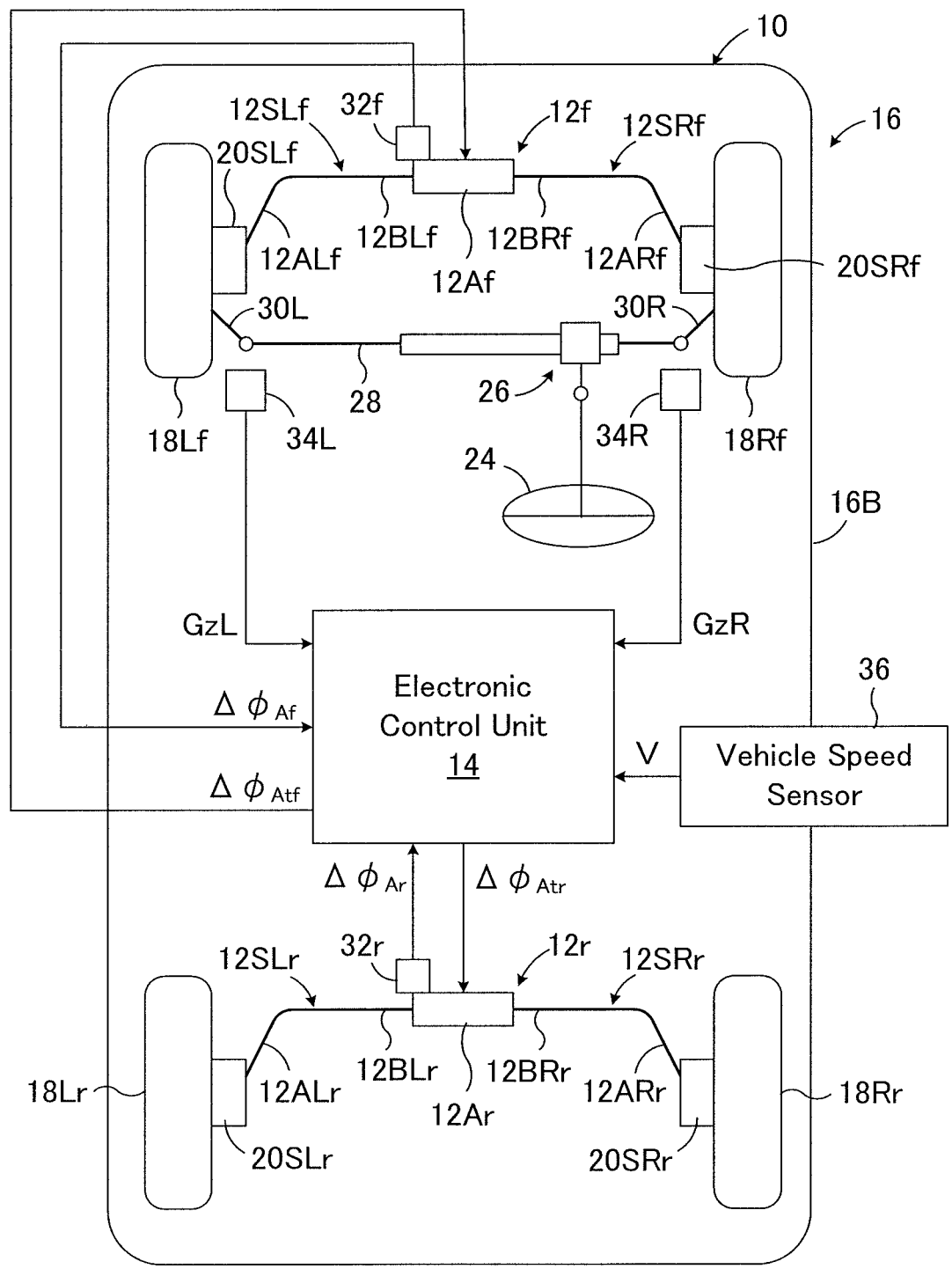
FIG. 1 is a schematic configuration diagram showing a first embodiment of a rolling control apparatus for a vehicle according to the present disclosure.

In FIG. 1, the roll control apparatus 10 includes a front wheel side active stabilizer device 12f, a rear wheel side active stabilizer device 12r, and an electronic control unit 14 which is a control unit for controlling the front wheel side and rear wheel side active stabilizer devices. The front wheel side active stabilizer device 12f has left and right stabilizers 12SLf, 12SRf including bars 12BLf and 12BRf extending in the lateral direction of the vehicle and arm portions 12ALf and 12ARt that are integral with the corresponding bars and extend in a direction crossing the bars (rearward), and an electric actuator 12Af that relatively rotates the bars of the right and left stabilizers. The bars 12BLf and 12BRf are supported by a vehicle body 16B of the vehicle 16 so as to be rotatable with respect to the vehicle body via a support member not shown in the figure. The arm portions 12ALf and 12ARf are connected at the outer ends to suspension members 20SLf and 20SRf of the left front wheel 18Lf and the right front wheel 18Rf, respectively.

Similarly, the rear wheel side active stabilizer device 12r has left and right stabilizers 12SLr, 12SRr including bars 12BRr and 12BRr extending in the lateral direction of the vehicle and arm portions 12ALr and 12ARr that are integral with the corresponding bars and extending in a direction crossing the bars (rearward), and an electric actuator 12Ar that relatively rotates the bars of the left and right stabilizers. The bars 12BLr and 12BRr are supported by the vehicle body 16B of the vehicle 16 so as to be rotatable with respect to the vehicle body via a support member not shown in the figure. The arm portions 12ALr and 12ARr are connected at the outer ends to the suspension members 20SLr and 20SRr of the left rear wheel 18Lr and the right rear wheel 18Rr, respectively.

Since the structures of the active stabilizer devices 12t and 12r themselves do not constitute the subject matter of the present disclosure, as long as they can generate an anti-roll moment for reducing a roll of the vehicle 16, they may be of any configuration known in the art. Regarding the structure of the active stabilizer device, if necessary, see, for example, Japanese Patent Application Laid-Open No. 2009-96366 filed by the present applicant.

As shown in FIG. 1, the left front wheel 18Lf and the right front wheel 18Rf are steered wheels, and the left rear wheel 18Lr and the right rear wheel 18Lr are non-steered wheels. The left front wheel 18Lf and the right front wheel 18Rf are steered by a rack bar 28 and tie rods 30L and 30R by a rack-and-pinion type power steering device 26 which is driven in response to operation of a steering wheel 24 by a driver.

The electronic control unit 14 calculates, as will be described in detail later, a target anti-roll moment Mart for reducing a roll of the vehicle 16 according to the flowchart shown in FIG. 2 based on the first embodiment of the above-described principle. Further, the control unit 14 calculates target rotation angles $\Delta\varphi_{Aft}$ and $\Delta\varphi_{Art}$ of the electric actuators 12Af and 12Ar for setting a sum Marf+Marr of anti-roll moments Mart and Marr generated by the front wheel side and rear wheel side active stabilizer devices 12f and 12r to the target anti-roll moment Mart. Since the above equations (1) and (2) are always satisfied, the target rotation angles $\Delta\varphi_{Aft}$ and $\Delta\varphi_{Art}$ are calculated as a combination of the rotation angles $\Delta\varphi_{Af}$ and $\Delta\varphi_{Ar}$ that minimize phase differences between the torsion angle $\Delta\varphi_{Ci}$ and the rotational angular velocity $\Delta\varphi d_{Ai}$ as small as possible while satisfying the above equations (1) and (2) and the above equation (5).

Further, the control unit 14 controls the front wheel side and rear wheel side active stabilizer devices so that rotation angles $\Delta\varphi_{Af}$ and $\Delta\varphi_{Ar}$ of the electric actuators 12Af and 12Ar become the target rotation angles $\Delta\varphi_{Aft}$ and $\Delta\varphi_{Art}$, respectively. In a situation where the electric motors of the electric actuators 12Af and 12Ar are rotated by the corresponding stabilizers, regeneration is performed by the electric motors. The control unit 14 controls the regeneration and regenerated electric power is supplied to a battery. Also in the third, fifth and seventh embodiments described later, electric motors of the electric actuators 12Af and 12Ar regenerate.

Signals indicating rotation angles $\Delta\varphi_{Af}$ and $\Delta\varphi_{Ar}$ of the electric actuators 12Af and 12Ar, that is, relative rotation angles of bars of the right and left stabilizers are input to the electronic control unit 14 from rotation angle sensors 32f and 32r provided in the electric actuators 12Af and 12Ar. Signals indicating the vertical acceleration GzL and GzR of the vehicle body 16B are input to the control unit 14 from vertical acceleration sensors 34L and 34R provided on the vehicle body in proximity to the left front wheel 18Lf and the right front wheel 18Rf, respectively. Further, a signal indicating a vehicle speed V is input from a vehicle speed sensor 36 to the control unit 14. The rotation angles $\Delta\varphi_{Af}$ and $\Delta\varphi_{Ar}$ of the electric actuators assume positive values when they are in the direction of reducing a roll of the vehicle body during the vehicle turns left, and the vertical acceleration GzL and GzR assume positive values when they are in the upward direction.

The electric actuators 12Af and 12Ar of the active stabilizer devices 12f and 12r are controlled by the electronic control unit 14 controlling the control current supplied to the electric motors. Although not shown in detail in FIG. 1, the electronic control unit 14 includes a microcomputer having a CPU, a ROM, a RAM, and an input/output port device, which are connected to each other by a bi-directional common bus and a drive circuit. The control program corresponding to the flowchart shown in FIG. 2 is stored in the ROM, and the calculations of the target rotation angles $\Delta\varphi_{Aft}$ and $\Delta\varphi_{Art}$ and the like are controlled by the CPU according to the control program. In the ROM, maps and the like necessary for calculation of the target rotation angles $\Delta\varphi_{Aft}$ and $\Delta\varphi_{Art}$ are also stored. The above-described configuration of the roll control apparatus 10 is the same in the second to eighth embodiments to be described later.

In particular, in the first embodiment, with respect to various frequencies ω for each of a plurality of vehicle speed ranges, optimum control gains Gft and Grt of rotation angles $\Delta\varphi_{Af}$ and $\Delta\varphi_{Ar}$ of the actuators 104Af and 104Ar with respect to a roll angular velocity φd of the vehicle body are previously obtained by simulation. The optimum control gains Gft and Grtf are values at which the evaluation function EF1 is minimized out of the control gains of rotation angles $\Delta_{\varphi Af}$ and $\Delta\varphi_{Ar}$ of the actuators 104Af and 104Ar with respect to a roll angular velocity φd of the vehicle body.

The specifications of the vehicle used in the simulation are as follows. In the following description of the first embodiment, "when the evaluation function EF1 becomes minimum" is expressed as "optimal control".

Figure 7:
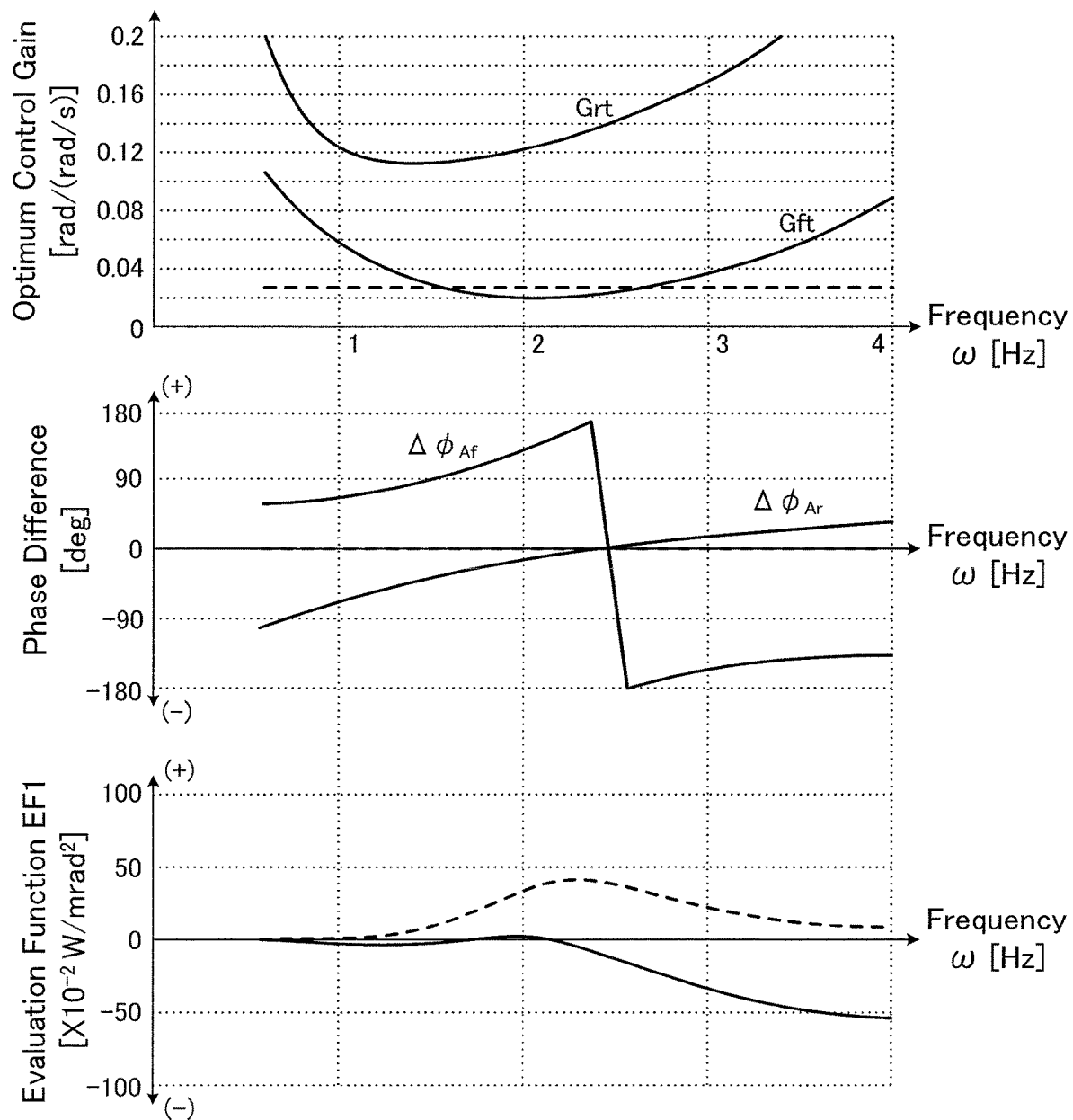
FIG. 7 shows graphs showing a relationship between a frequency ω of a roll angle φ and optimum control gains Gft and Grt (upper part), a relationship between a frequency ω of a roll angle φ and phase differences between a rotation angles $\Delta\varphi_{Af}$ and $\Delta\varphi_{Ar}$ of the front wheel side and rear wheel side actuators with respect to a roll angular velocity φd of the vehicle body at the time of optimum control (middle part), and a relationship between a frequency ω of a roll angle φ and an evaluation function EF1 (average power) at the time of optimum control (lower part), in the first embodiment.

Roll moment of inertia of the vehicle body: 768 kgm$^2$
Roll stiffness of front wheels: 1500 Nm/deg
Roll stiffness of rear wheel: 1000 Nm/deg
Damping coefficient of shock absorbers of front wheels: 1920 Nm/(rad/s)
Damping coefficient of shock absorbers of rear wheels: 1920 Nm/(rad/s)
Control coefficient C: 2000 Nm/(rad/s)
Sprung mass of the vehicle: 2000 kg
Height of gravity center: 0.55 m
Tread: 1.6 m
Wheelbase: 2.78 m The upper part in FIG. 7 shows a relationship between a frequency ω of a roll angle φ of the vehicle body 100B and optimum control gains Gft and Grt in the vehicle speed range of 90 to 100 km/h, together with the control gain (broken line) in the prior art. The middle part in FIG. 7 shows a relationship between a frequency ω of a roll angle φ and phase differences of the rotation angles $\Delta\varphi_{Af}$ and $\Delta\varphi_{Ar}$ of the actuators 104Af and 104Ar with respect to a roll angular velocity φd of the vehicle body at the time of optimum control together with a phase difference (broken line) in the prior art.

The lower part in FIG. 7 shows a relationship between a frequency ω of the roll angle φ and the evaluation function (average power) EF1 at the time of optimum control, together with a relationship (broken line) in the case of the conventional technique, for the above vehicle speed range. It is to be noted that the prior art is a roll control apparatus in which the control gains Gf and Gr of the rotation angles $\Delta\varphi_{Af}$ and $\Delta\varphi_{Ar}$ of the actuators 104Af and 104Ar are set to a constant value of 0.027 rad/(rad/s) in the vehicle having the same specification as in the first embodiment. This also applies to other embodiments to be described later. From the lower part in FIG. 7, it is seen that the evaluation function EF1 at the time of optimum control is lower than that in the prior art except for the range where a frequency ω of the roll angle φ is low.

The relationship between a frequency ω of the roll angle φ and optimum control gains Gft and Grt is shown only for the above-mentioned vehicle speed range in the upper part in FIG. 7, but varies depending on a vehicle speed range. Although not shown in the figure, as a vehicle speed V decreases, the optimum control gain Gft increases and the optimum control gain Grt decreases. The ROM of the electronic control unit 14 stores the relationships between the frequency ω and the optimum control gains Gft and Grt for a plurality of vehicle speed ranges divided at intervals of 10 km/h as maps.

Next, the control routine of the active stabilizer devices 12f and 12r in the first embodiment will be described with reference to the flowchart shown in FIG. 2. The control according to the flowchart shown in FIG. 2 is repeatedly executed at predetermined time intervals when an ignition switch (not shown) is on.

First, in step 10, signals indicating vertical accelerations GzL and GzR of the vehicle body 16B detected by the vertical acceleration sensors 34L and 34R and the like are read.

In step 20, a difference Gzr-GzL between the vertical accelerations Gzr and GzL is integrated to calculate a roll angular velocity φd of the vehicle body 16B.

In step 30, a target anti-roll moment Mart for reducing a roll of the vehicle body is calculated based on the roll angular velocity φd according to the above equation (3).

In step 40, a vehicle speed range to which a vehicle speed V belongs is specified, and from among a plurality of maps (the upper part in FIG. 7 and the like) showing the relationship between a frequency ω and optimum control gains Gft and Grt, a map for the specified vehicle speed range is determined.

In step 50, a roll frequency ω of the vehicle body, which is a frequency of a periodic change of the roll angle φ of the vehicle body 16B, is calculated based on the roll angular velocity φd of the vehicle body 16B calculated in step 20. Further, optimum control gains Gft and Grt are calculated by referring to the map determined in step 40 based on a roll frequency ω of the vehicle body.

In step 60, target rotation angles $\Delta\varphi_{Aft}$ and $\Delta\varphi_{Art}$ of the electric actuators 12Af and 12Ar of the front wheel side and rear wheel side active stabilizer devices 12f and 12r are calculated according to the following equations (16) and (17), respectively.

$$\Delta\varphi_{Aft}=Gft\cdot\varphi d \quad (16)$$

$$\Delta\varphi_{Art}=Grt\cdot\varphi d \quad (17)$$

In step 70, the front wheel side and rear wheel side active stabilizer devices 12t and 12r are controlled so that rotation angles $\Delta\varphi_{Af}$ and $\Delta\varphi_{Ar}$ of the electric actuators 12Af and 12Ar become the target rotation angles $\Delta\varphi_{Aft}$ and $\Delta\varphi_{Art}$, respectively.

Figure 8:
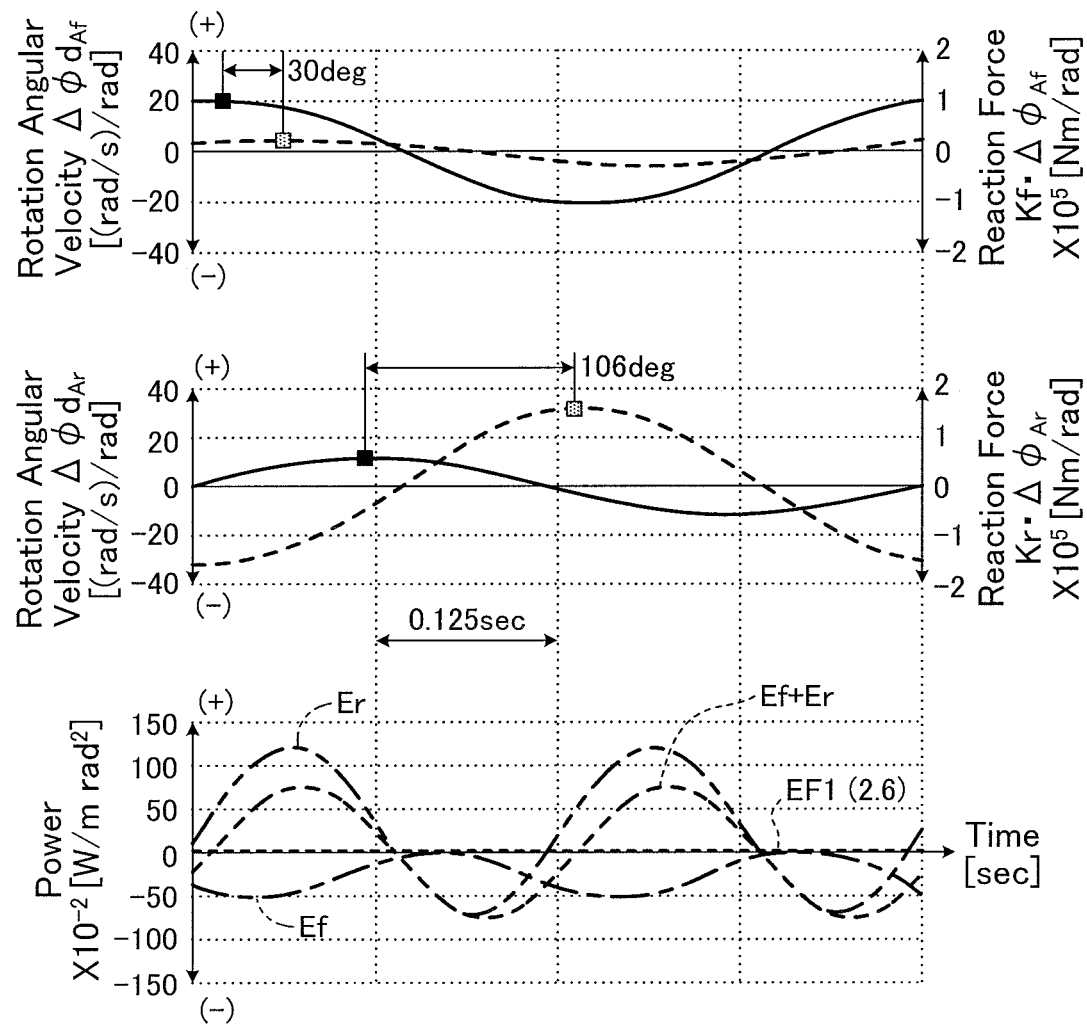
FIG. 8 shows graphs showing performance of the first embodiment.
Figure 9:
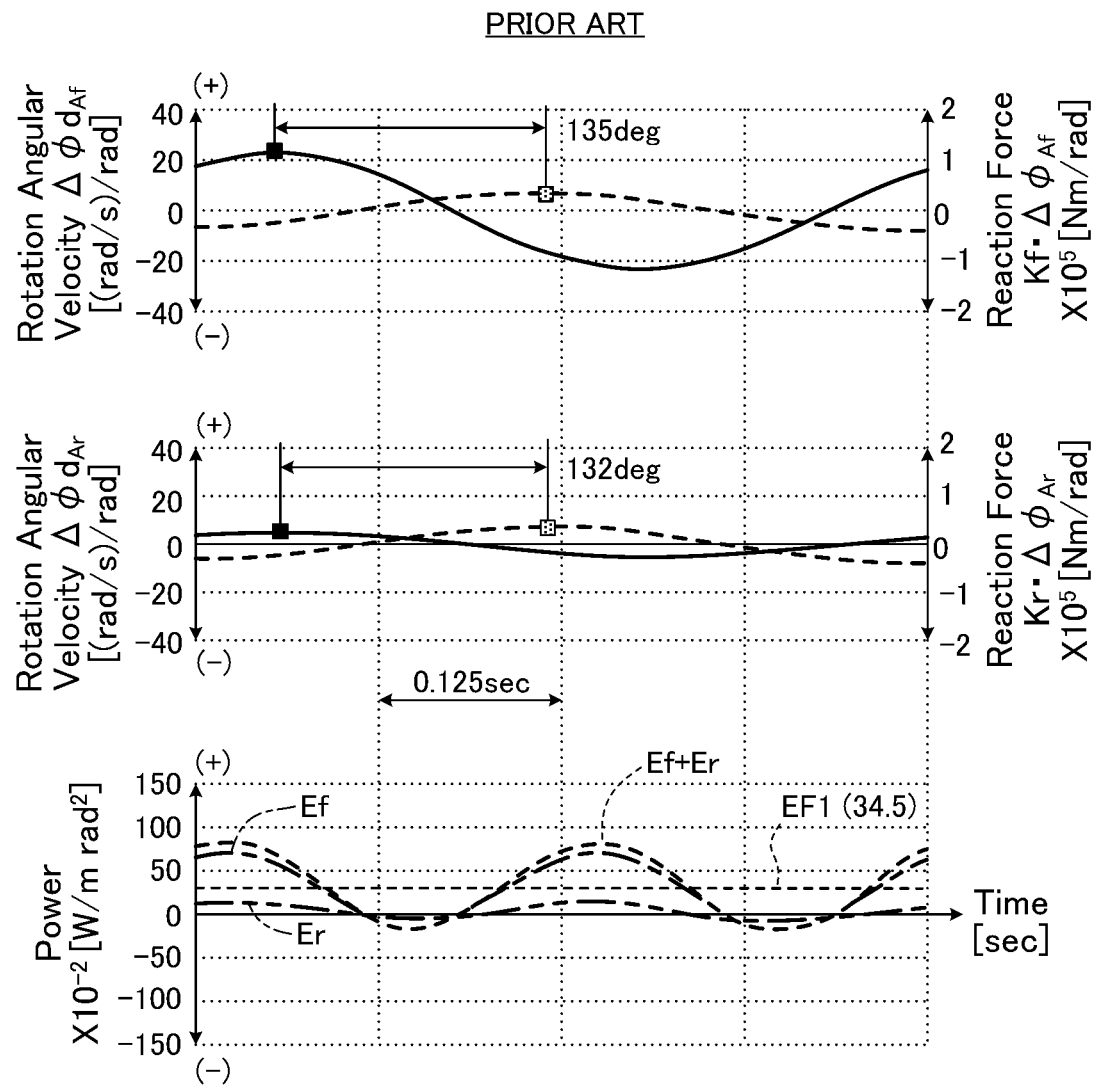
FIG. 9 shows graphs showing performance of the prior art corresponding to FIG. 8.

FIGS. 8 and 9 are graphs showing the performance of the first embodiment and the prior art, respectively, with respect to a case where a vehicle speed V is 100 km/h and a roll frequency ω of the vehicle body is 2 Hz. In particular, each upper part shows a reaction force ($=Kf\cdot\Delta\varphi_{Af}$) (solid line) of the front wheel side active stabilizer device 12f and a rotational angular velocity $\Delta\varphi d_{Af}$ (broken line) of the actuator 104Af. Each middle part shows a reaction force $Kr\cdot\Delta\varphi_{Ar}$ (solid line) of the rear wheel side active stabilizer device 12r and a rotation angular velocity $\Delta\varphi d_{Ar}$ (broken line) of the actuator 104Ar. Further, each lower part shows a power (Ef) of the front wheel side active stabilizer device 12f (one-dot chain line), a power Er (two-dot chain line) of the rear wheel side active stabilizer device 12r, a sum (dashed line) of the powers Ef and Er, and an average power (evaluation function EF1) (thin dashed line) of the front wheel side and rear wheel side active stabilizer devices 12f and 12r.

As shown in the upper parts in FIGS. 8 and 9, the phase difference between the reaction force of the front wheel side active stabilizer device and the rotational angular velocity of the actuator in the prior art is 135 degrees, whereas in the first embodiment the same phase difference is 30 degrees. As shown in the middle parts in FIGS. 8 and 9, the phase difference between the reaction force of the rear wheel side active stabilizer device and the rotational angular velocity of the actuator in the prior art is 132 degrees, while the same phase difference in the first embodiment is 106 degrees. Thus, the phase difference between the reaction force of the active stabilizer device and the rotational angular velocity of the actuator in the first embodiment are smaller than the phase difference in the prior art for both the front wheel side and the rear wheel side.

As shown in the lower parts in FIGS. 8 and 9, the average power EF1 in the prior art is $34.5\times10^{-2}$ W/mrad², while the average power EF1 in the first embodiment is $2.6\times10^{-2}$ W/mrad². Even when a vehicle speed range is in a vehicle speed range other than 90 to 100 km/h, an average power EF1 of the front wheel side and rear wheel side active stabilizer devices 12f and 12r can be reduced as compared with the prior art. Therefore, according to the first embodiment, energy consumption of the front wheel side and rear wheel side active stabilizer devices can be reduced and fuel consumption of the vehicle can be improved as compared with the prior art.

Second Embodiment

In the second embodiment, the electronic control unit 14 controls the front wheel side and rear wheel side active stabilizer devices so that rotation angles $\Delta\varphi_{Af}$ and $\Delta\varphi_{Ar}$ of the electric actuators 12Af and 12Ar become target rotation angles $\Delta\varphi_{Aft}$ and $\Delta\varphi_{Art}$, respectively similarly to the first embodiment, except the following points. Note that regeneration by the electric motors of the electric actuators 12Af and 12Ar is not performed. That is, even in a situation where the electric motors of the electric actuators 12Af and 12Ar are rotated by the corresponding stabilizers, regeneration is not performed. Also in the fourth, sixth and eighth embodiments to be described later, regeneration by the electric motors of the electric actuators 12Af and 12Ar is not performed.

In the second embodiment, gains Gf and Gr of rotation angles $\Delta\varphi_{Af}$ and $\Delta_{Ar}$ of the actuators 104Af and 104Ar with respect to the roll angular velocity φd of the vehicle body when the evaluation function EF2 becomes minimum for various frequencies w for each of a plurality of vehicle speed ranges, are obtained in advance by simulation as optimum control gains Gft and Grt, respectively. The specification of the vehicle used for the simulation is the same as the specification of the first embodiment. In the following description of the second embodiment, "the control when the evaluation function EF2 becomes minimum" is expressed as "optimal control".

Figure 10:
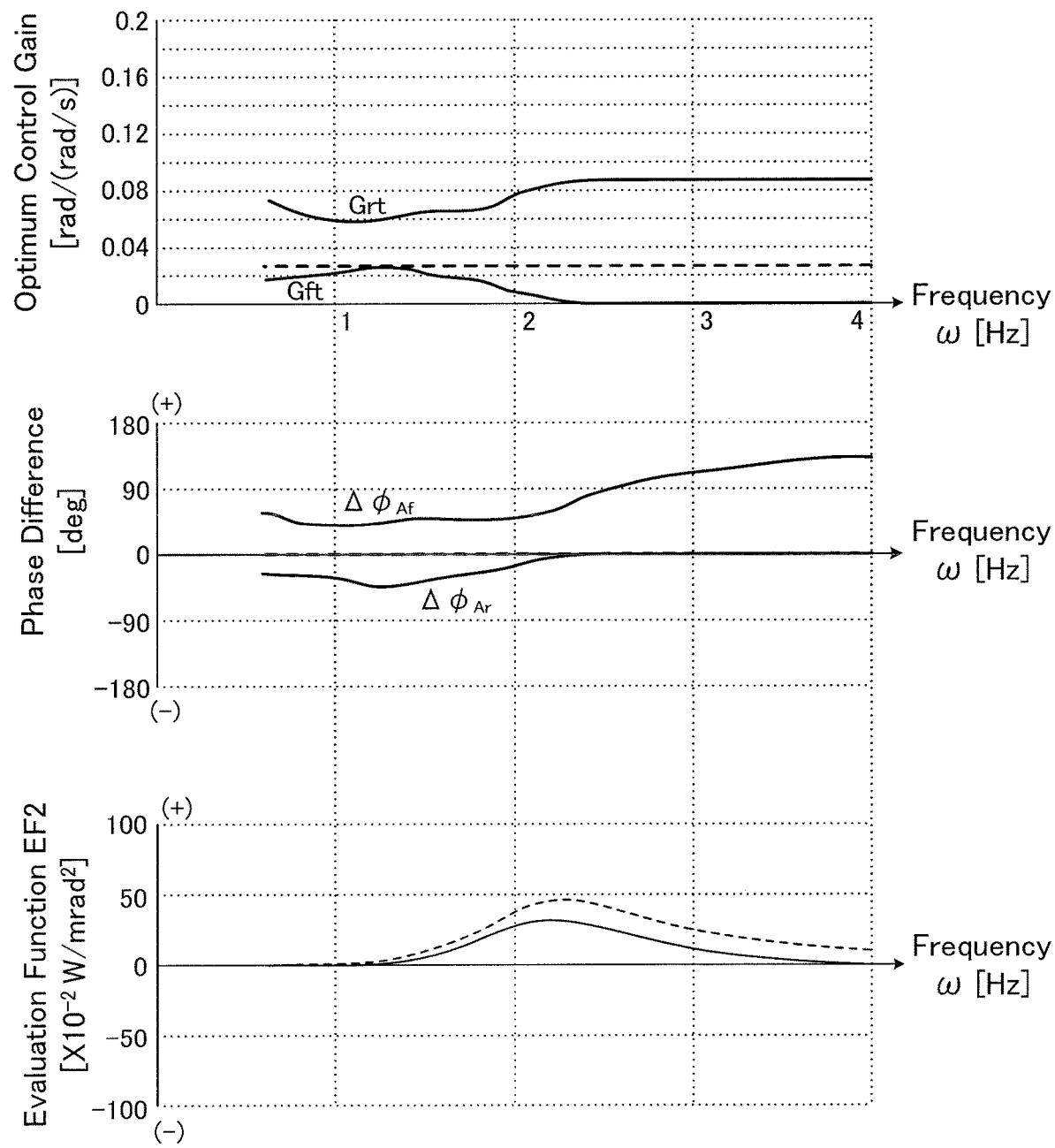
FIG. 10 shows graphs showing a relationship between a frequency ω of a roll angle φ and optimum control gains Gft and Grt (upper part), a relationship between a frequency ω of a roll angle φ and phase differences between rotation angles $\Delta\varphi_{Af}$ and $\Delta\varphi_{Ar}$ of the front wheel and rear wheel side actuators with respect to a roll angular velocity φd of the vehicle body at the time of optimum control (middle part), and a relationship between a frequency ω of a roll angle φ and an evaluation function EF2 (average power) at the time of optimum control (lower part), in the second embodiment.

The upper, the middle and the lower parts in FIG. 10 correspond to the upper, the middle and the lower parts in FIG. 7, respectively. In particular, the lower part in FIG. 10 shows a relationship between a frequency ω of a roll angle φ and the evaluation function (average power) EF2 at the time of optimum control in the vehicle speed range of 90 to 100 km/h together with a relationship (broken line) in the prior art. From the lower part in FIG. 10, it is seen that the evaluation function EF2 at the time of optimum control is lower than that in the prior art except for the range where the frequency ω of the roll angle φ is low.

The relationship between a frequency ω of a roll angle φ and optimum control gains Gft and Grt is shown only for the above-mentioned vehicle speed range in the upper part in FIG. 10, but differs depending on a vehicle speed range. Although not shown in the figure, as in the first embodiment, as a vehicle speed V decreases, the optimum control gain Gft increases and the optimum control gain Grt decreases. The ROM of the electronic control unit 14 stores the relationships between the frequency ω and optimum control gains Gft and Grt for a plurality of vehicle speed ranges divided at intervals of 10 km/h as maps.

Figure 2:
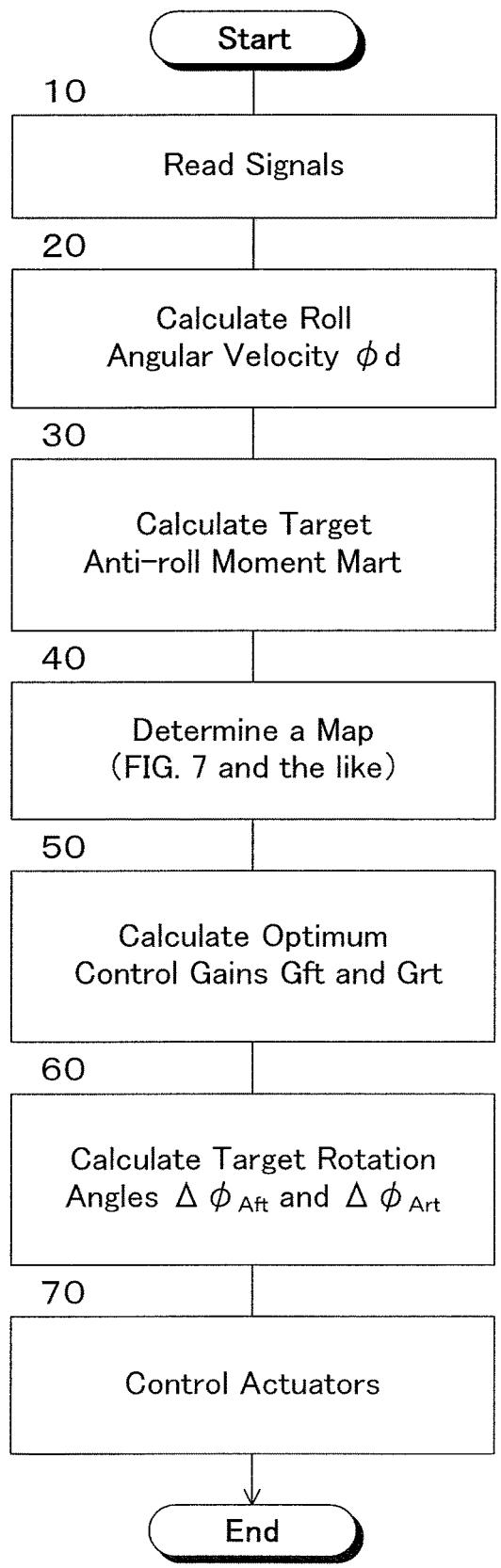
FIG. 2 is a flowchart showing a roll control routine according to the first embodiment.

Also in the second embodiment, the roll control is performed in the same manner as in the first embodiment according to the flowchart shown in FIG. 2. However, in the step 40 in the second embodiment, a vehicle speed range to which a vehicle speed V belongs is specified and a map for the specified vehicle speed range is specified from a plurality of maps (the upper part in FIG. 10) showing the relationships between a frequency ω and optimum control gains Gft and Grt.

Figure 11:
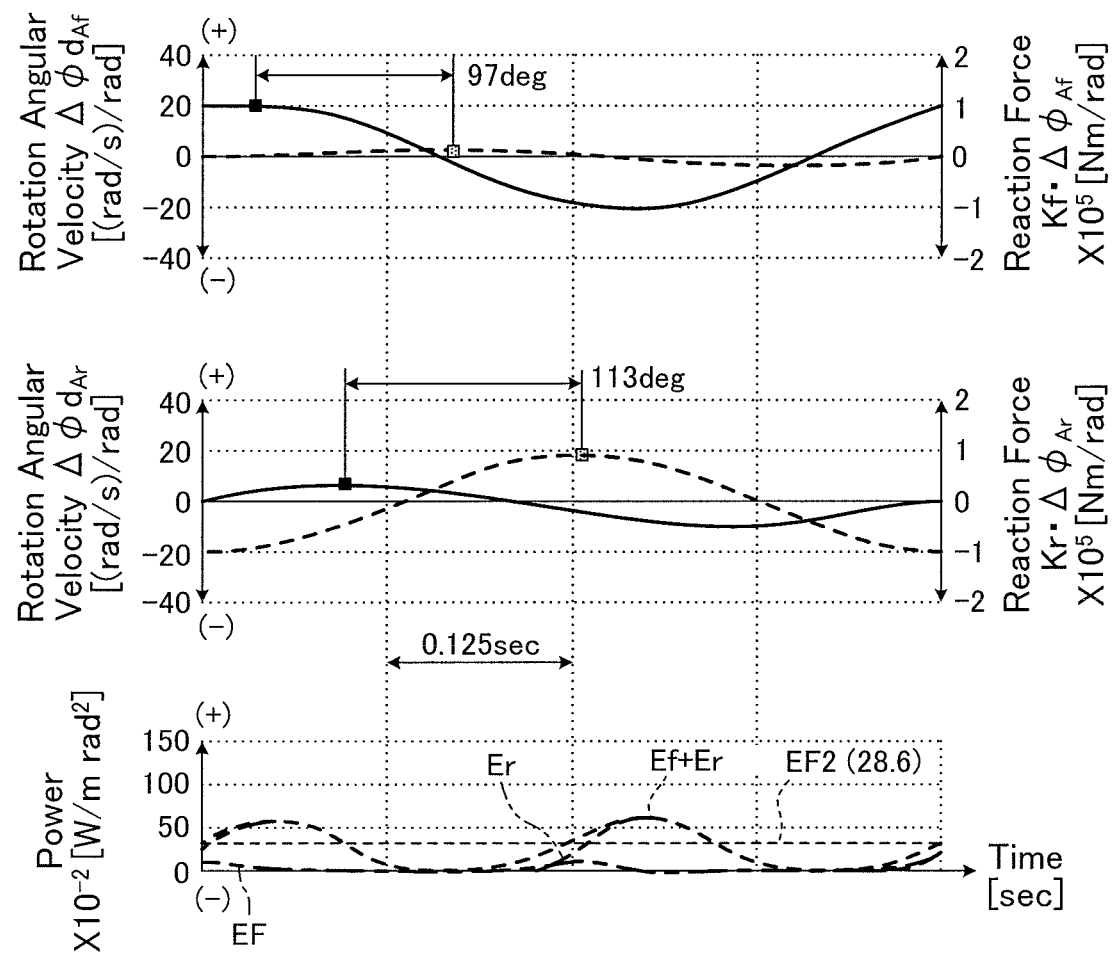
FIG. 11 shows graphs showing performance of the second embodiment.
Figure 12:
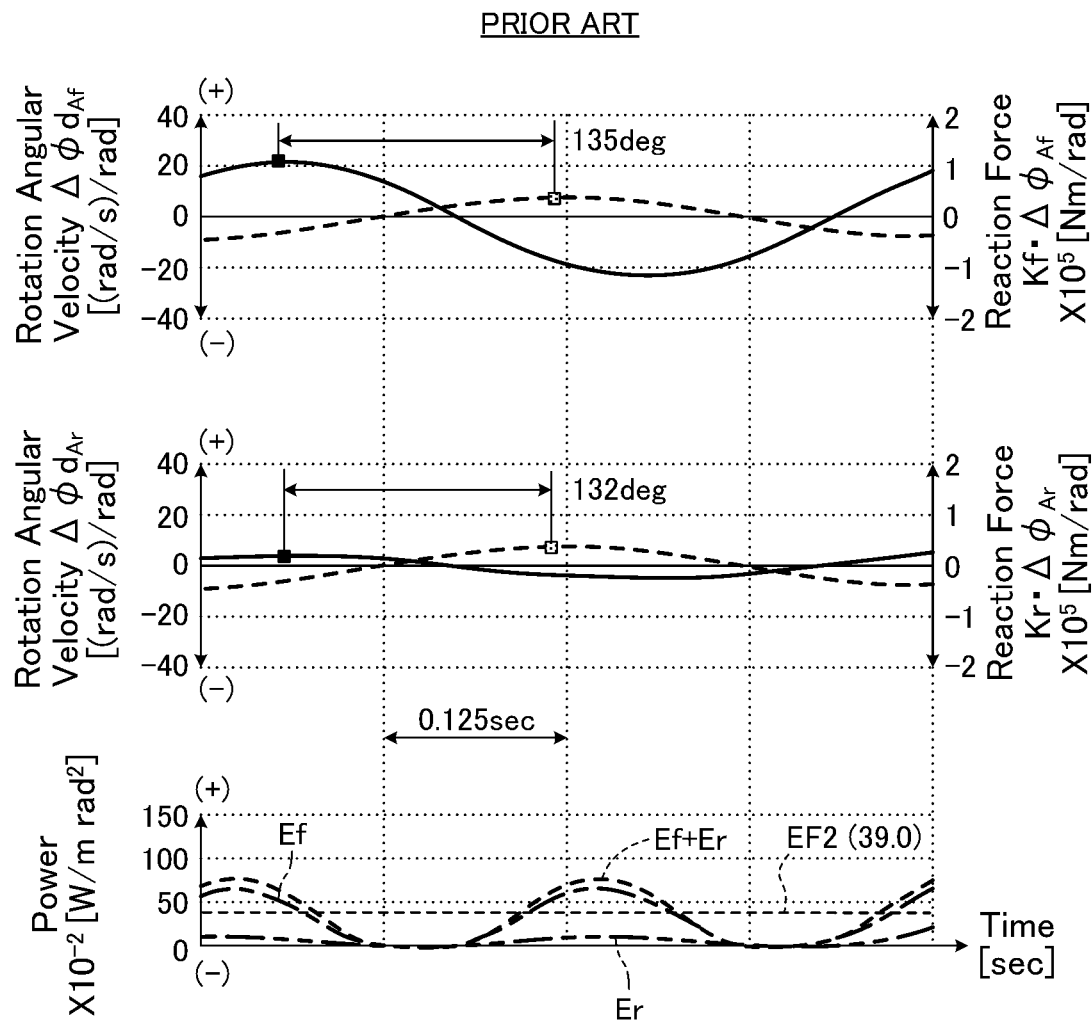
FIG. 12 shows graphs showing performance of the prior art corresponding to FIG. 11.

FIGS. 11 and 12 are graphs showing the performance of the second embodiment and the prior art with respect to the case where a vehicle speed V is 100 km/h and a roll frequency ω of the vehicle body is 2 Hz, and correspond to FIGS. 8 and 9, respectively. In particular, the thin dashed line in the lower part shows an average power (evaluation function EF2) of the front wheel side and rear wheel side active stabilizer devices 12f and 12r.

As shown in the upper parts in FIGS. 11 and 12, a phase difference between a reaction force of the front wheel side active stabilizer device and a rotational angular velocity of the actuator in the prior art is 135 degrees, while a phase difference in the second embodiment is 97 degrees. As shown in the middle parts in FIGS. 11 and 12, a phase difference between a reaction force of the rear wheel side active stabilizer device and a rotational angular velocity of the actuator in the prior art is 132 degrees, while a phase difference in the second embodiment is 113 degrees. Therefore, the phase difference of the reaction force of the active stabilizer device and the rotational angular velocity of the actuator in the second embodiment is smaller than the same phase difference in the prior art for both the front wheel side and the rear wheel side.

As shown in the lower parts in FIGS. 11 and 12, the average power EF2 in the prior art is $39.0 \times 10^{-2}$ W/mrad$^2$ while the average power EF2 in the second embodiment is $28.6 \times 10^{-2}$ W/mrad$^2$. Even when the vehicle speed range is a vehicle speed range other than 90 to 100 km/h, the average power EF2 of the front wheel side and rear wheel side active stabilizer devices 12f and 12r can be reduced as compared with the prior art. Therefore, according to the second embodiment, as in the first embodiment, it is possible to reduce energy consumption of the front wheel side and rear wheel side active stabilizer devices and to improve fuel consumption of the vehicle as compared with the prior art.

In particular, from the comparison between the first and second embodiments, it is seen that an amount by which the average power of the front wheel side and rear wheel side active stabilizer devices can be reduced as compared with the prior art is larger when the regeneration by the electric motors is performed than that when the regeneration by the electric motors is not performed.

Third Embodiment

In the third embodiment, gains Gf and Gr of rotation angles $\Delta\varphi_{Af}$ and $\Delta\varphi_{Ar}$ of the actuators 104Af and 104Ar with respect to the roll angular velocity φd of the vehicle body when the evaluation function EF3 becomes minimum for various frequencies ω for each of a plurality of vehicle speed ranges partitioned every 10 km/h, are obtained in advance by simulation as optimum control gains Gft and Grt, respectively. The specification of the vehicle used for the simulation is the same as the specification of the first embodiment. In the following description of the third embodiment, "the control when the evaluation function EF3 becomes minimum" is expressed as "optimal control".

Figure 13:
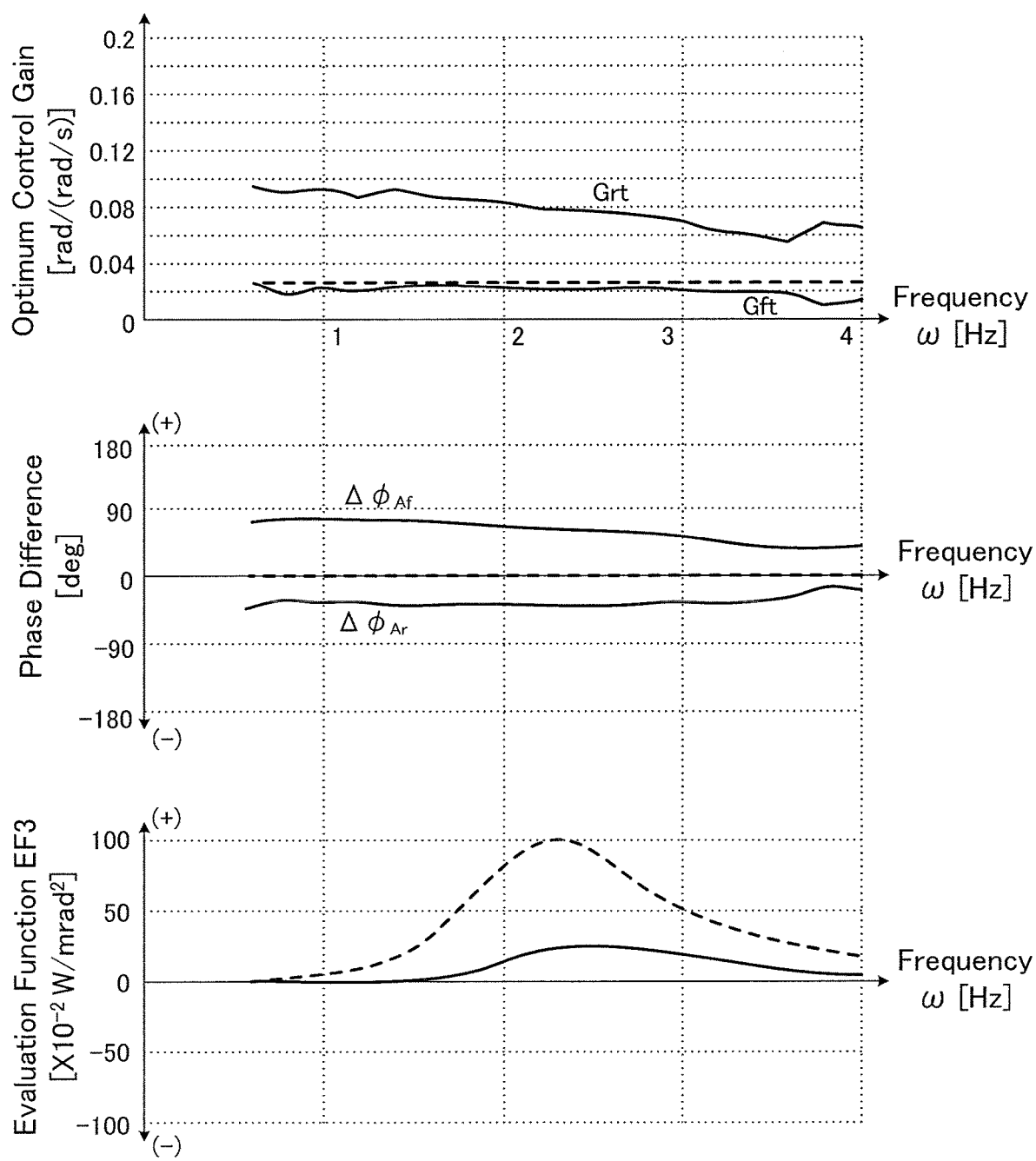
FIG. 13 shows graphs showing a relationship between a frequency ω of a roll angle φ and optimum control gains Gft and Grt (upper part), a relationship between a frequency ω of a roll angle φ and phase differences between rotation angles $\Delta\varphi_{Af}$ and $\Delta\varphi T_{Ar}$ of the front wheel and rear wheel side actuators with respect to a roll angular velocity $\varphi$ of the vehicle body at the time of optimum control (middle part), and a relationship between a frequency $\omega$ of a roll angle $\varphi$ and an evaluation function EF3 (instantaneous maximum power) at the time of optimum control (lower part), in the third embodiment.

The upper, the middle and the lower parts in FIG. 13 correspond to the upper, the middle and the lower parts in FIG. 7, respectively. In particular, the lower part in FIG. 13 shows a relationship between a frequency ω of a roll angle φ and the evaluation function (instantaneous maximum power) EF3 at the time of optimum control in the vehicle speed range of 90 to 100 km/h together with a relationship (broken line) in the prior art. From the lower part in FIG. 13, it is seen that the evaluation function EF3 at the time of optimum control is lower than that in the prior art except for the range where the frequency ω of the roll angle φ is low.

The relationship between a frequency ω of a roll angle φ and optimum control gains Gft and Grt is shown only for the above-mentioned vehicle speed range in the upper part in FIG. 13, but differs depending on a vehicle speed range. Although not shown in the figure, as in the first and second embodiments, as a vehicle speed V decreases, the optimum control gain Gft increases and the optimum control gain Grt decreases. The ROM of the electronic control unit 14 stores the relationships between a frequency ω and optimum control gains Gft and Grt for a plurality of vehicle speed ranges divided at intervals of 10 km/h as maps.

Also in the third embodiment, the roll control is performed in the same manner as in the first embodiment according to the flowchart shown in FIG. 2. However, in the step 40 in the third embodiment, a vehicle speed range to which a vehicle speed V belongs is specified and a map for the specified vehicle speed range is specified from a plurality of maps (the upper part in FIG. 13) showing the relationships between a frequency ω and optimum control gains Gft and Grt.

Figure 14:
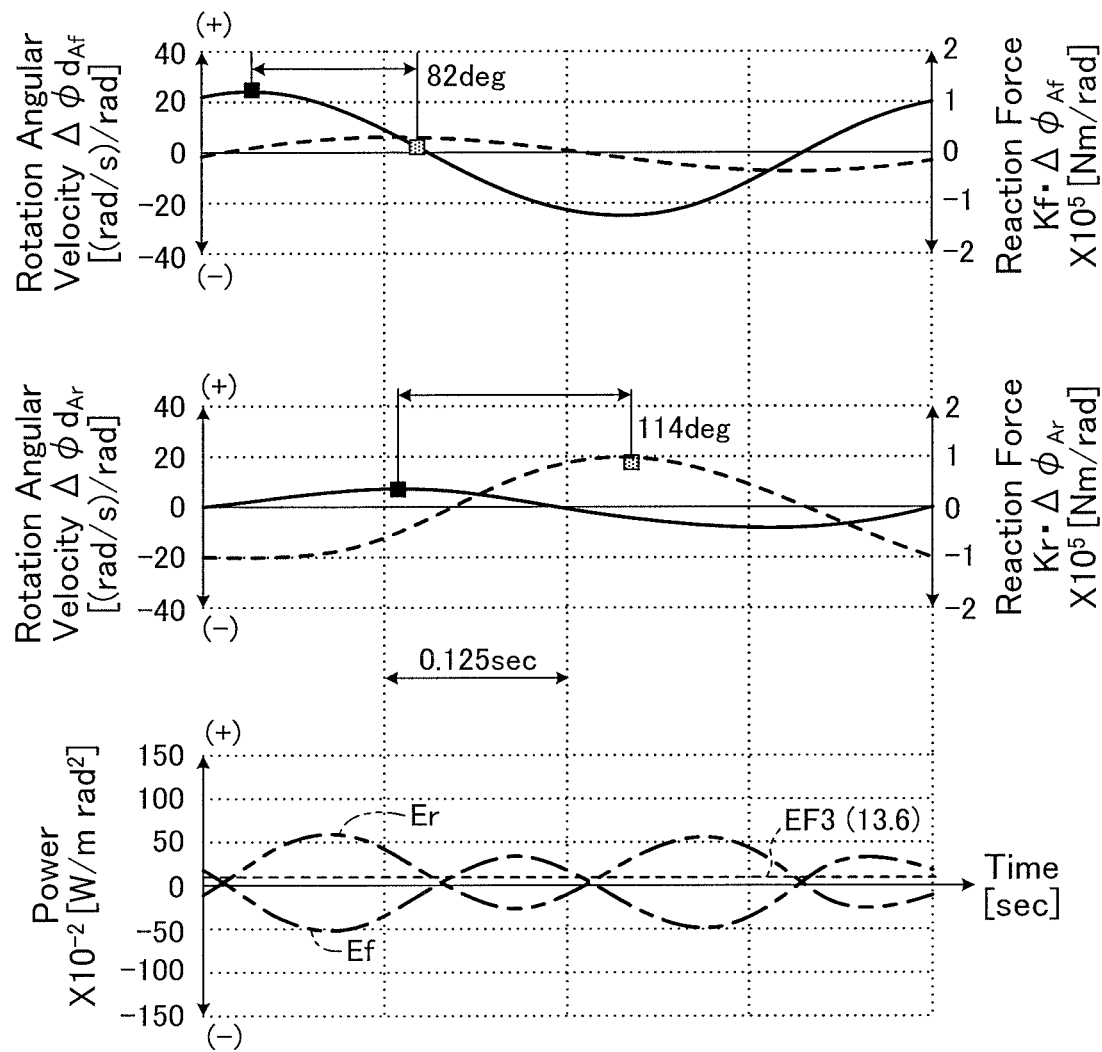
FIG. 14 shows graphs showing performance of the third embodiment.
Figure 15:
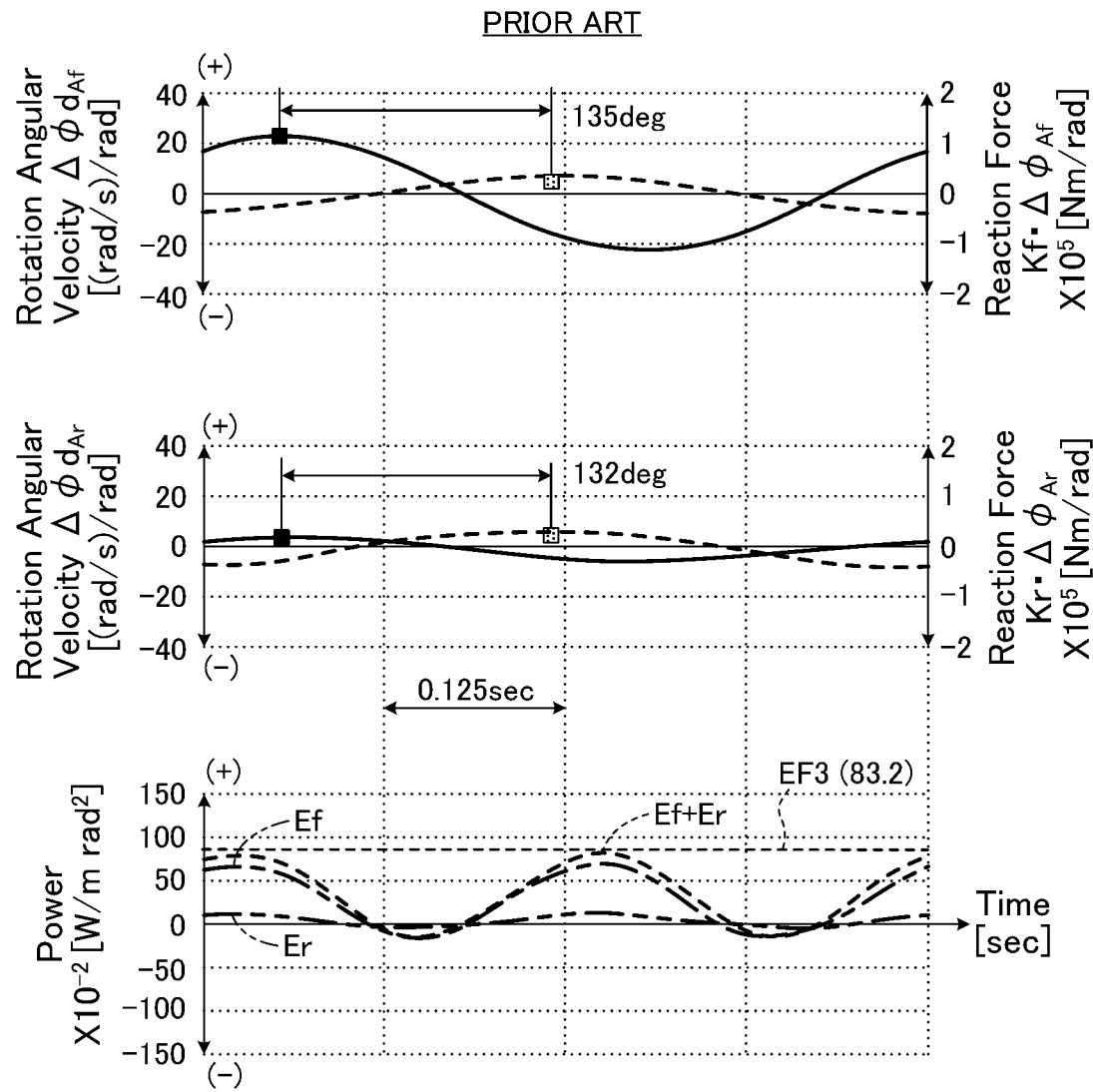
FIG. 15 shows graphs showing performance of the prior art corresponding to FIG. 14.

FIGS. 14 and 15 are graphs showing the performance of the third embodiment and the prior art with respect to the case where a vehicle speed V is 100 km/h and a roll frequency ω of the vehicle body is 2 Hz, and correspond to FIGS. 8 and 9, respectively. In particular, the thin dashed line in the lower part shows an instantaneous maximum power (evaluation function EF3) of the front wheel side and rear wheel side active stabilizer devices 12f and 12r.

As shown in the upper parts in FIGS. 14 and 15, a phase difference between a reaction force of the front wheel side active stabilizer device and a rotational angular velocity of the actuator in the prior art is 135 degrees, while a phase difference in the third embodiment is 82 degrees. As shown in the middle parts in FIGS. 14 and 15, a phase difference between a reaction force of the rear wheel side active stabilizer device and a rotational angular velocity of the actuator in the prior art is 132 degrees, while a phase difference in the third embodiment is 114 degrees. Therefore, the phase difference of the reaction force of the active stabilizer device and the rotational angular velocity of the actuator in the third embodiment is smaller than the same phase difference in the prior art for both the front wheel side and the rear wheel side.

As shown in the lower parts in FIGS. 14 and 15, the instantaneous maximum power EF3 in the prior art is $83.2 \times 10^{-2}$ W/mrad$^2$ while the instantaneous maximum power EF3 in the third embodiment is $13.6 \times 10^{-2}$ W/mrad$^2$. Even when the vehicle speed range is a vehicle speed range other than 90 to 100 km/h, the instantaneous maximum power EF3 of the front wheel side and rear wheel side active stabilizer devices 12f and 12r can be reduced as compared with the prior art. Therefore, according to the third embodiment, it is possible to reduce a peak value of energy consumption of the front wheel side and rear wheel side active stabilizer devices as compared with the prior art.

Fourth Embodiment

In the fourth embodiment, gains Gf and Gr of rotation angles $\Delta\varphi_{Af}$ and $\Delta\varphi_{Ar}$ of the actuators 104Af and 104Ar with respect to the roll angular velocity φd of the vehicle body when the evaluation function EF4 becomes minimum for various frequencies ω for each of a plurality of vehicle speed ranges partitioned every 10 km/h, are obtained in advance by simulation as optimum control gains Gft and Grt, respectively. The specification of the vehicle used for the simulation is the same as the specification of the first embodiment. In the following description of the fourth embodiment, "the control when the evaluation function EF4 becomes minimum" is expressed as "optimal control".

Figure 16:
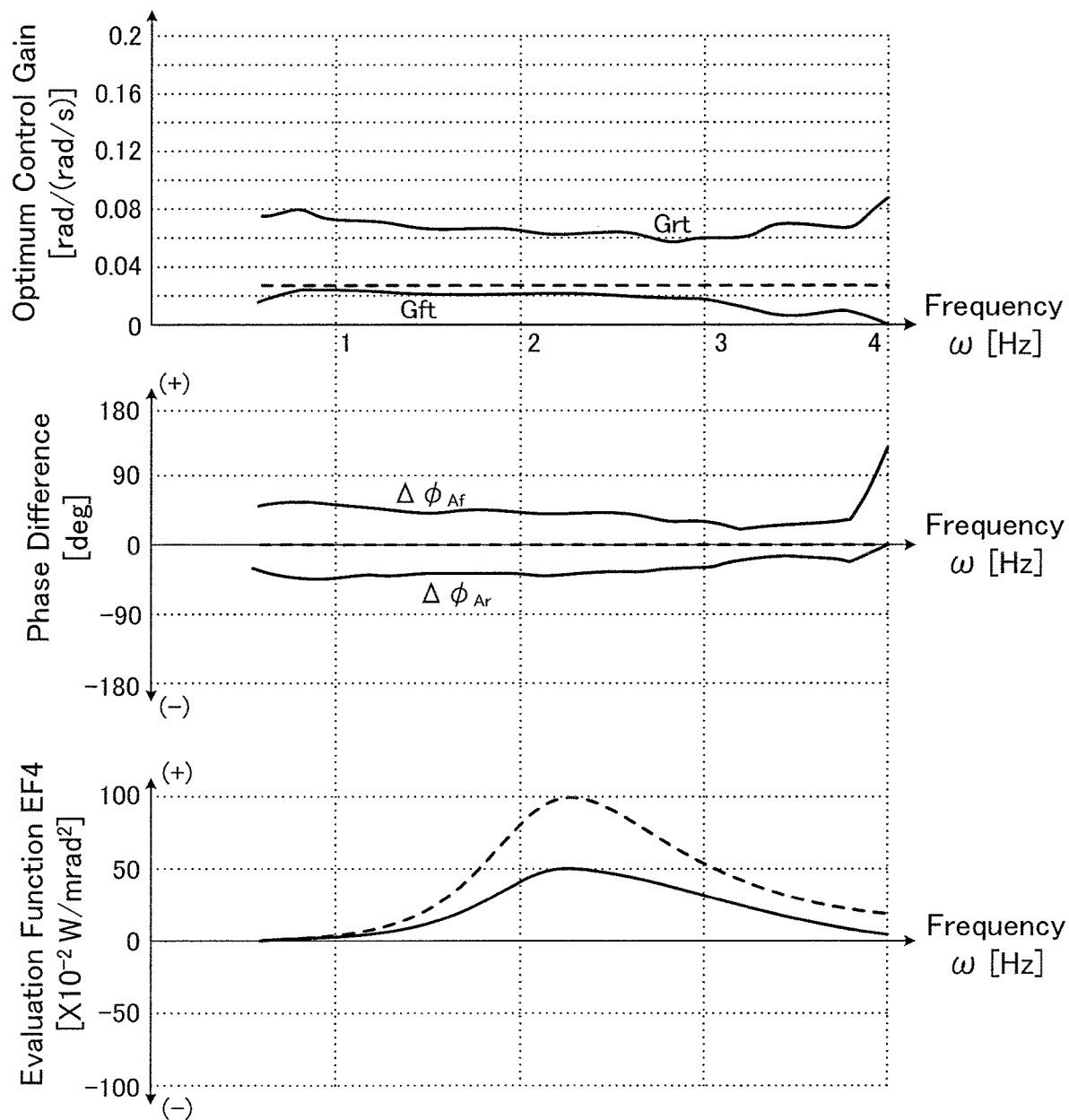
FIG. 16 shows graphs showing a relationship between a frequency $\omega$ of a roll angle $\varphi$ and optimum control gains Gft and Grt (upper part), a relationship between a frequency $\omega$ of a roll angle $\varphi$ and phase difference a between rotation angles $\Delta\varphi_{Af}$ and $\Delta\varphi_{Ar}$ of the front wheel and rear wheel side actuators with respect to a roll angular velocity $\varphi d$ of the vehicle body at the time of optimum control (middle part), and a relationship between a frequency $\omega$ of a roll angle $\varphi$ and an evaluation function EF4 (instantaneous maximum power) at the time of optimum control (lower part), in the fourth embodiment.

The upper, the middle and the lower parts in FIG. 16 correspond to the upper, the middle and the lower parts in FIG. 7, respectively. In particular, the lower part in FIG. 16 shows a relationship between a frequency ω of a roll angle φ and the evaluation function (instantaneous maximum power) EF4 at the time of optimum control in the vehicle speed range of 90 to 100 km/h together with a relationship (broken line) in the prior art. From the lower part in FIG. 16, it is seen that the evaluation function EF4 at the time of optimum control is lower than that in the prior art except for the range where the frequency ω of the roll angle φ is low.

The relationship between a frequency ω of a roll angle φ and optimum control gains Gft and Grt is shown only for the above-mentioned vehicle speed range in the upper part in FIG. 16, but differs depending on a vehicle speed range. Although not shown in the figure, as in the first to third embodiments, as a vehicle speed V decreases, the optimum control gain Gft increases and the optimum control gain Grt decreases. The ROM of the electronic control unit 14 stores the relationships between a frequency ω and optimum control gains Gft and Grt for a plurality of vehicle speed ranges divided at intervals of 10 km/h as maps.

Also in the fourth embodiment, the roll control is performed in the same manner as in the first embodiment according to the flowchart shown in FIG. 2. However, in the step 40 in the fourth embodiment, a vehicle speed range to which a vehicle speed V belongs is specified and a map for the specified vehicle speed range is specified from a plurality of maps (the upper part in FIG. 16) showing the relationships between a frequency ω and optimum control gains Gft and Grt.

Figure 17:
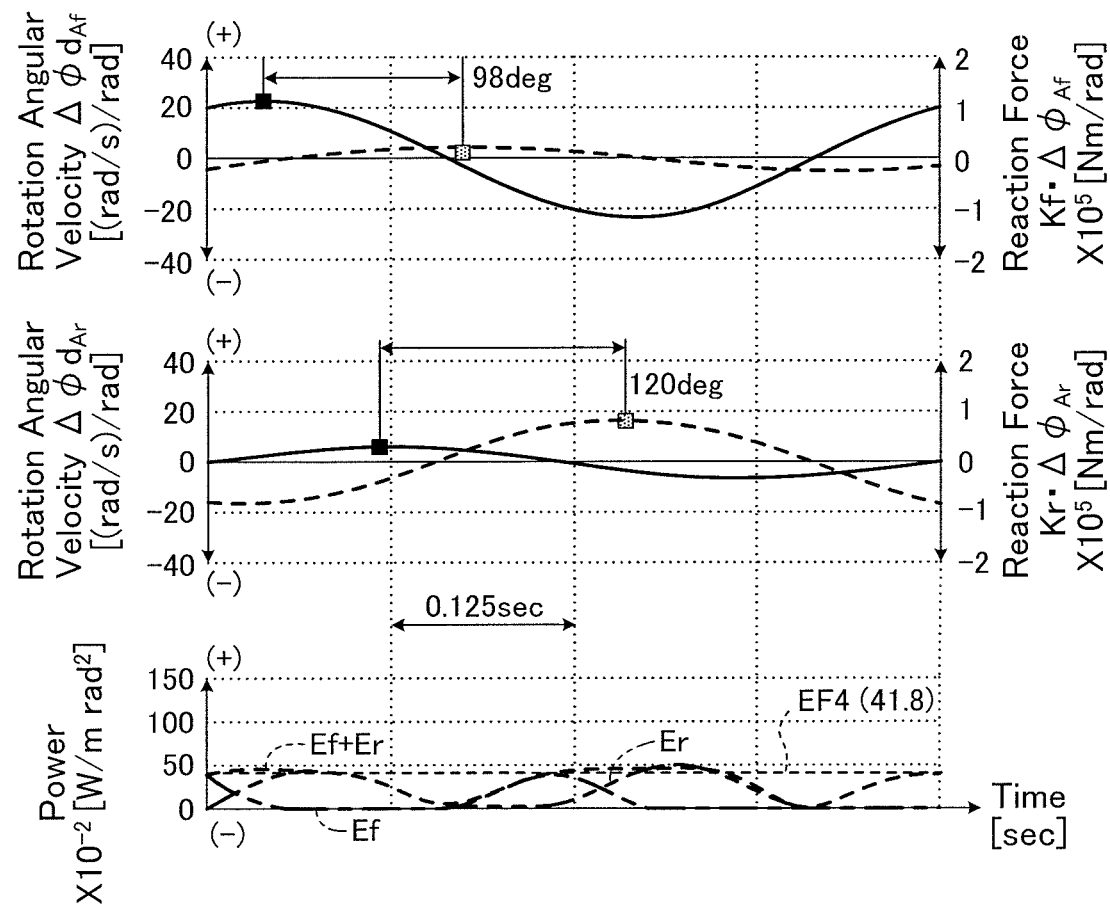
FIG. 17 shows graphs showing performance of the fourth embodiment.
Figure 18:
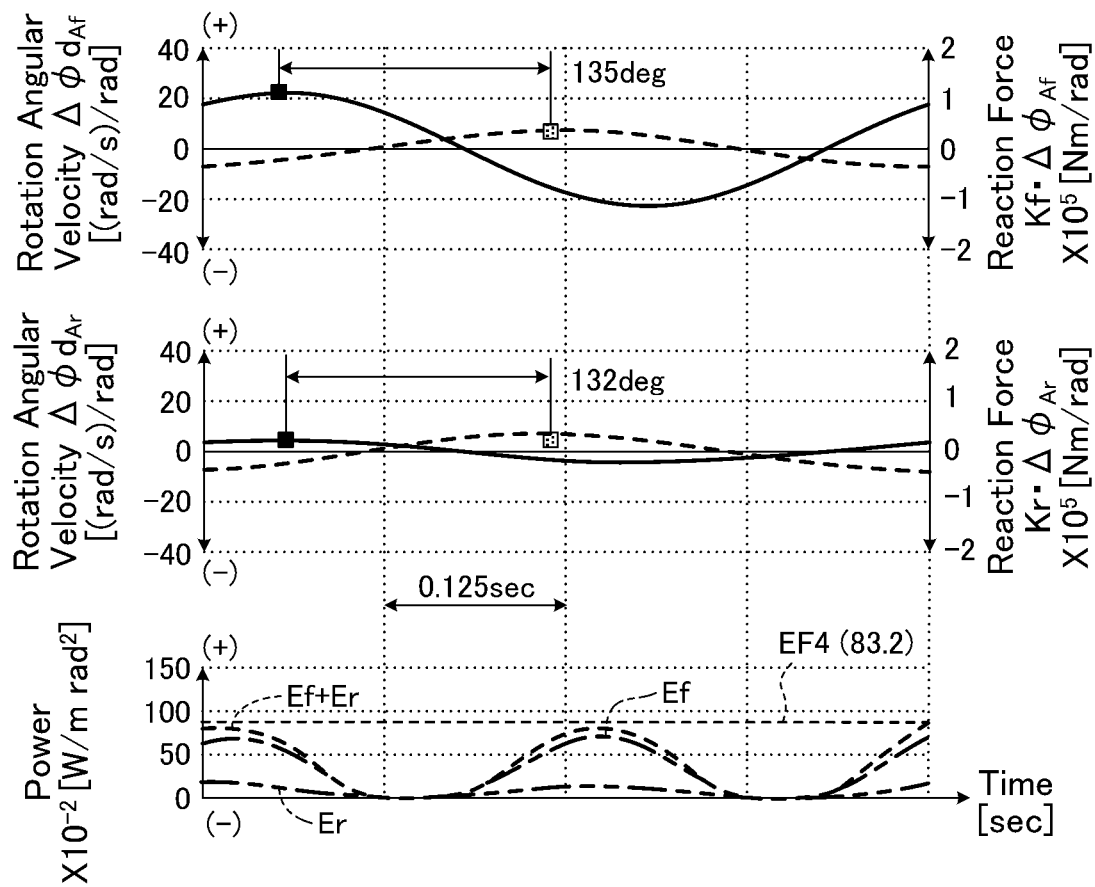
FIG. 18 shows graphs showing performance of the prior art corresponding to FIG. 17.

FIGS. 17 and 18 are graphs showing the performance of the fourth embodiment and the prior art with respect to the case where a vehicle speed V is 100 km/h and a roll frequency ω of the vehicle body is 2 Hz, and correspond to FIGS. 8 and 9, respectively. In particular, the thin dashed line in the lower part shows an instantaneous maximum power (evaluation function EF4) of the front wheel side and rear wheel side active stabilizer devices 12f and 12r.

As shown in the upper parts in FIGS. 17 and 18, a phase difference between a reaction force of the front wheel side active stabilizer device and a rotational angular velocity of the actuator in the prior art is 135 degrees, while a phase difference in the fourth embodiment is 98 degrees. As shown in the middle parts in FIGS. 17 and 18, a phase difference between a reaction force of the rear wheel side active stabilizer device and a rotational angular velocity of the actuator in the prior art is 132 degrees, while a phase difference in the fourth embodiment is 120 degrees. Therefore, the phase difference of the reaction force of the active stabilizer device and the rotational angular velocity of the actuator in the fourth embodiment are smaller than the same phase difference in the prior art for both the front wheel side and the rear wheel side.

As shown in the lower parts in FIGS. 17 and 18, the instantaneous maximum power EF4 in the prior art is $83.2 \times 10^{-2}$ W/mrad$^2$ while the instantaneous maximum power EF4 in the fourth embodiment is $41.8 \times 10^{-2}$ W/mrad$^2$. Even when a vehicle speed range is the vehicle speed range other than 90 to 100 km/h, the instantaneous maximum power EF4 of the front wheel side and rear wheel side active stabilizer devices 12f and 12r can be reduced as compared with the prior art. Therefore, according to the fourth embodiment, as in the third embodiment, it is possible to reduce a peak value of energy consumption of the front wheel side and rear wheel side active stabilizer devices as compared with the prior art.

In particular, from the comparison between the third and fourth embodiments, it is seen that an amount by which the instantaneous maximum power of the front wheel side and rear wheel side active stabilizer devices can be reduced as compared with the prior art is larger than that when the regeneration by the electric motor is not performed.

Fifth Embodiment

In the fifth embodiment, gains Gf and Gr of rotation angles $\Delta\varphi_{Af}$ and $\Delta\varphi_{Ar}$ of the actuators 104Af and 104Ar with respect to the roll angular velocity φd of the vehicle body when the evaluation function EF5 becomes minimum for various frequencies ω for each of a plurality of vehicle speed ranges partitioned every 10 km/h, are obtained in advance by simulation as optimum control gains Gft and Grt, respectively. The specification of the vehicle used for the simulation is the same as the specification of the first embodiment. In the following description of the fifth embodiment, "the control when the evaluation function EF5 becomes minimum" is expressed as "optimal control".

Figure 19:
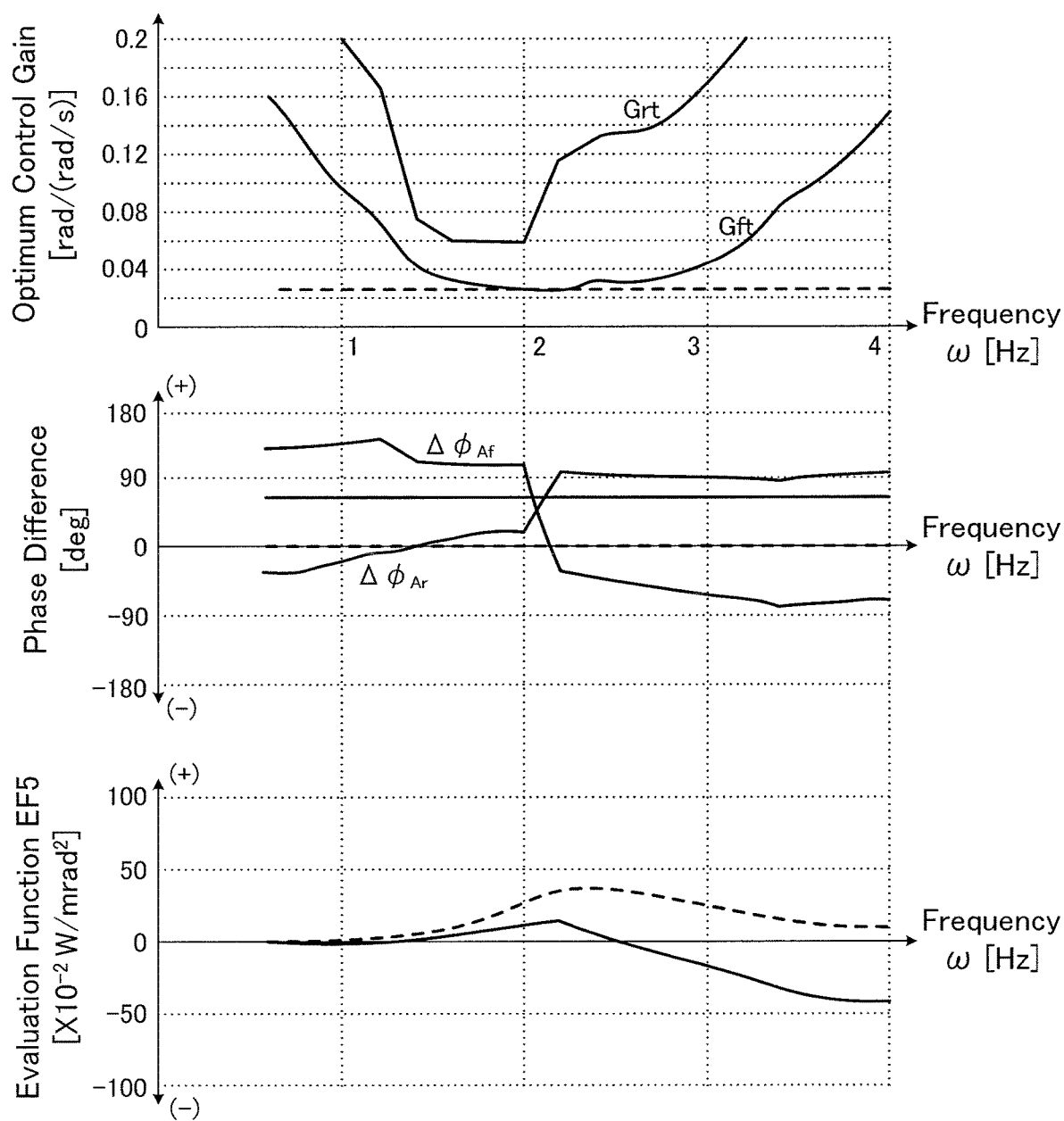
FIG. 19 is shows graphs showing a relationship between a frequency $\omega$ of a roll angle $\varphi$ and optimum control gains Gft and Grt (upper part), a relationship between a frequency $\omega$ of a roll angle $\varphi$ and phase differences between rotation angles $\Delta\varphi_{Af}$ and $\Delta\varphi_{Ar}$ of the front wheel and rear wheel side actuators with respect to a roll angular velocity $\varphi d$ of the vehicle body at the time of optimum control (middle part), and a relationship between a frequency $\omega$ of a roll angle $\varphi$ and an evaluation function EF5 (larger one of the average powers) at the time of optimum control (lower part), in the fifth embodiment.

The upper, the middle and the lower parts in FIG. 19 correspond to the upper, the middle and the lower parts in FIG. 7, respectively. In particular, the lower part in FIG. 19 shows a relationship between a frequency ω of a roll angle φ and a larger one of the average powers (the evaluation function EF5) at the time of optimum control in the vehicle speed range of 90 to 100 km/h together with a relationship (broken line) in the prior art. From the lower part in FIG. 19, it is seen that the evaluation function EF5 at the time of optimum control is lower than that in the prior art except for the range where the frequency ω of the roll angle φ is low.

The relationship between a frequency ω of a roll angle φ and optimum control gains GEL and Grt is shown only for the above-mentioned vehicle speed range in the upper part in FIG. 19, but differs depending on a vehicle speed range. Although not shown in the figure, as in the first to fourth embodiments, as a vehicle speed V decreases, the optimum control gain Gft increases and the optimum control gain Grt decreases. The ROM of the electronic control unit 14 stores the relationships between a frequency ω and optimum control gains Gft and Grt for a plurality of vehicle speed ranges divided at intervals of 10 km/h as maps.

Also in the fifth embodiment, the roll control is performed in the same manner as in the first embodiment according to the flowchart shown in FIG. 2. However, in the step 40 in the fifth embodiment, a vehicle speed range to which a vehicle speed V belongs is specified and a map for the specified vehicle speed range is specified from a plurality of maps (the upper part in FIG. 19) showing the relationships between a frequency ω and optimum control gains Gft and Grt.

Figure 20:
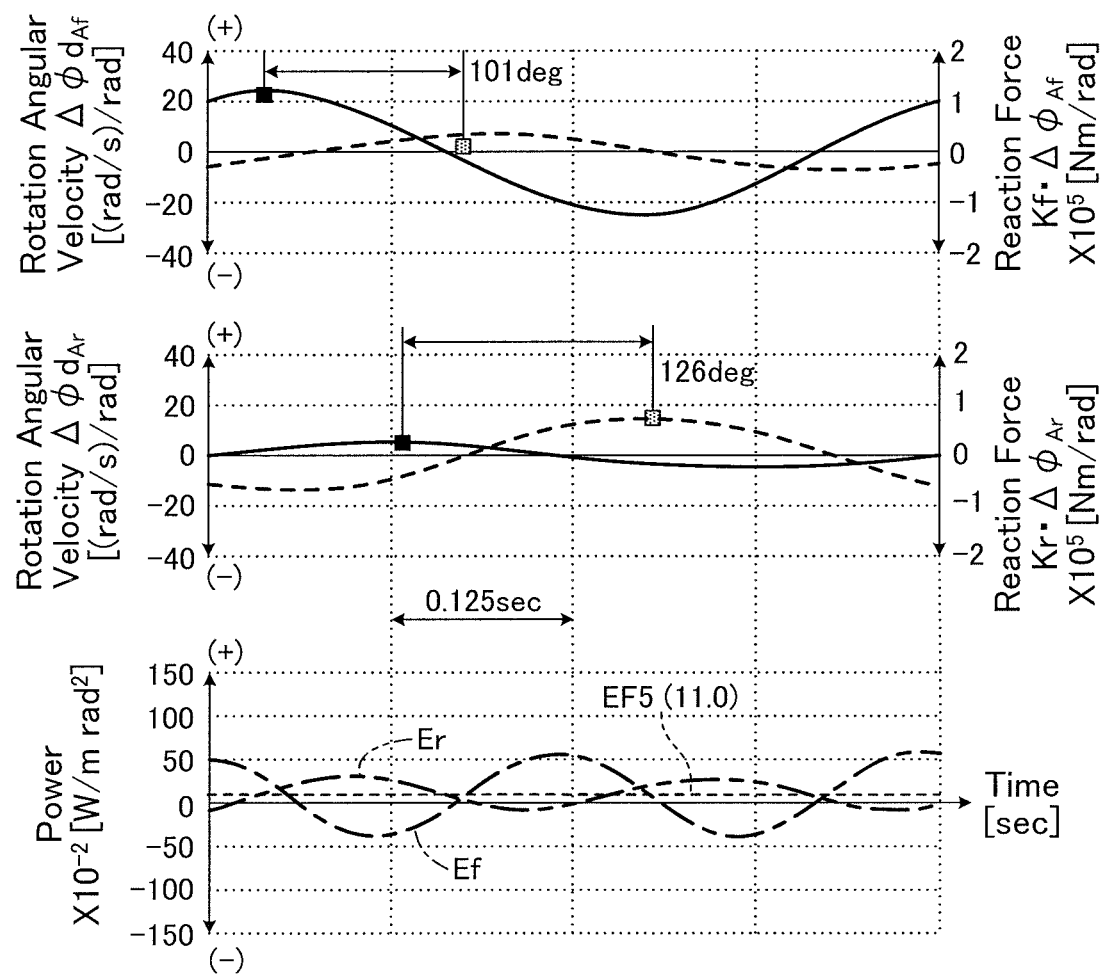
FIG. 20 shows graphs showing performance of the fifth embodiment.
Figure 21:
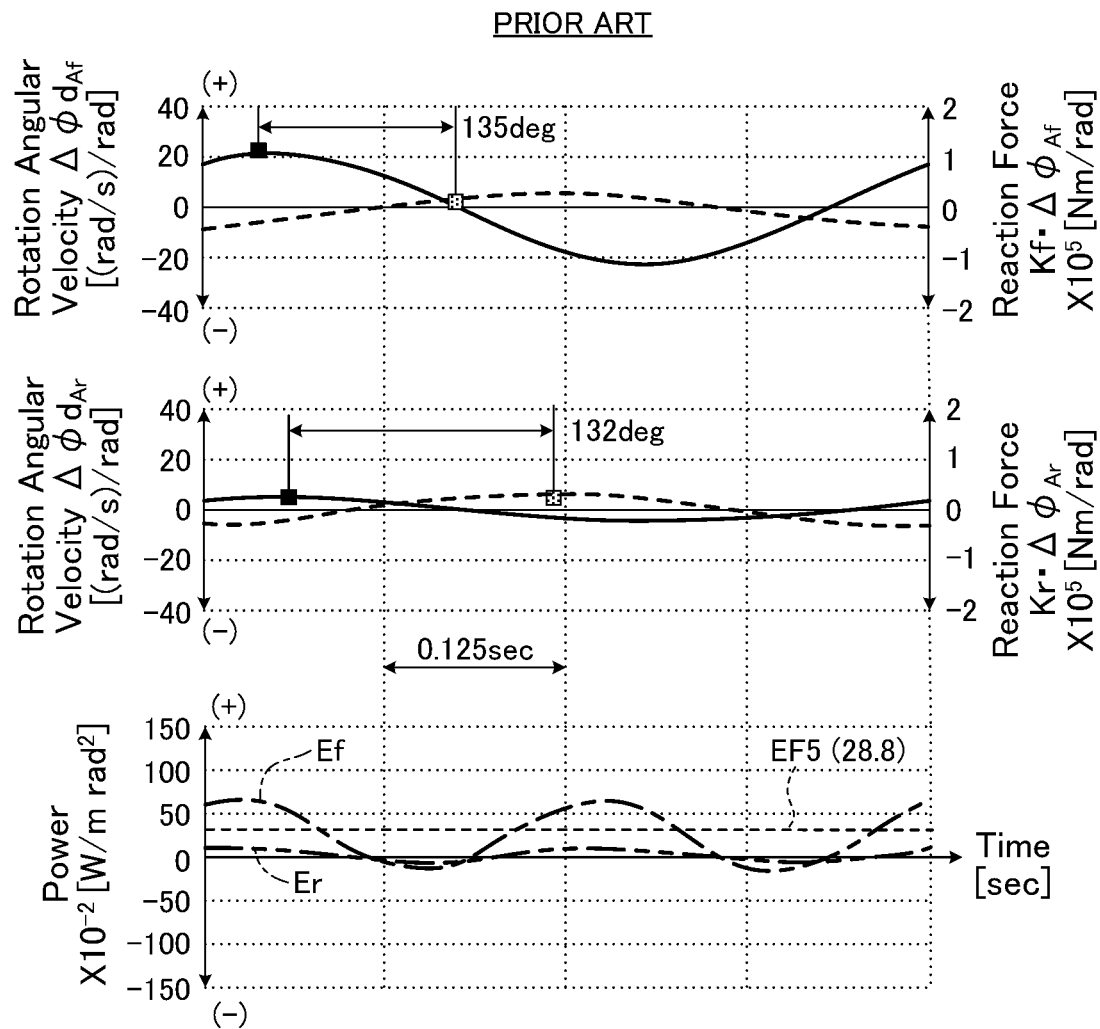
FIG. 21 shows graphs showing performance of the prior art corresponding to FIG. 20.

FIGS. 20 and 21 are graphs showing the performance of the fifth embodiment and the prior art with respect to the case where a vehicle speed V is 100 km/h and a roll frequency ω of the vehicle body is 2 Hz, and correspond to FIGS. 8 and 9, respectively. In particular, the thin dashed line in the lower part shows a larger one of the average powers (the evaluation function EF5) of the front wheel side and rear wheel side active stabilizer devices 12f and 12r.

As shown in the upper parts in FIGS. 20 and 21, a phase difference between a reaction force of the front wheel side active stabilizer device and a rotational angular velocity of the actuator in the prior art is 135 degrees, while a phase difference in the fifth embodiment is 101 degrees. As shown in the middle parts in FIGS. 20 and 21, a phase difference between a reaction force of the rear wheel side active stabilizer device and a rotational angular velocity of the actuator in the prior art is 132 degrees, while a phase difference in the fifth embodiment is 126 degrees. Therefore, the phase difference of the reaction force of the active stabilizer device and the rotational angular velocity of the actuator in the fifth embodiment are smaller than the same phase difference in the prior art for both the front wheel side and the rear wheel side.

As shown in the lower parts in FIGS. 20 and 21, a larger one of the average powers EF5 in the prior art is $28.8 \times 10^{-2}$ W/mrad$^2$ while a larger one of the average powers EF5 in the fifth embodiment is $11.0 \times 10^{-2}$ W/mrad$^2$. Even when the vehicle speed range is a vehicle speed range other than 90 to 100 km/h, a larger one of the average powers EF5 of the front wheel side and rear wheel side active stabilizer devices 12f and 12r can be reduced as compared with the prior art. Therefore, according to the fifth embodiment, it is possible to decrease a larger one of average powers of the front wheel side and rear wheel side active stabilizer devices so as to reduce a risk of thermal damage to the actuators.

Sixth Embodiment

In the sixth embodiment, gains Gf and Gr of rotation angles $\Delta\varphi_{Af}$ and $\Delta\varphi_{Ar}$ of the actuators 104Af and 104Ar with respect to the roll angular velocity φd of the vehicle body when the evaluation function EF6 becomes minimum for various frequencies w for each of a plurality of vehicle speed ranges partitioned every 10 km/h, are obtained in advance by simulation as optimum control gains Gft and Grt, respectively. The specification of the vehicle used for the simulation is the same as the specification of the first embodiment. In the following description of the sixth embodiment, "the control when the evaluation function EF6 becomes minimum" is expressed as "optimal control".

Figure 22:
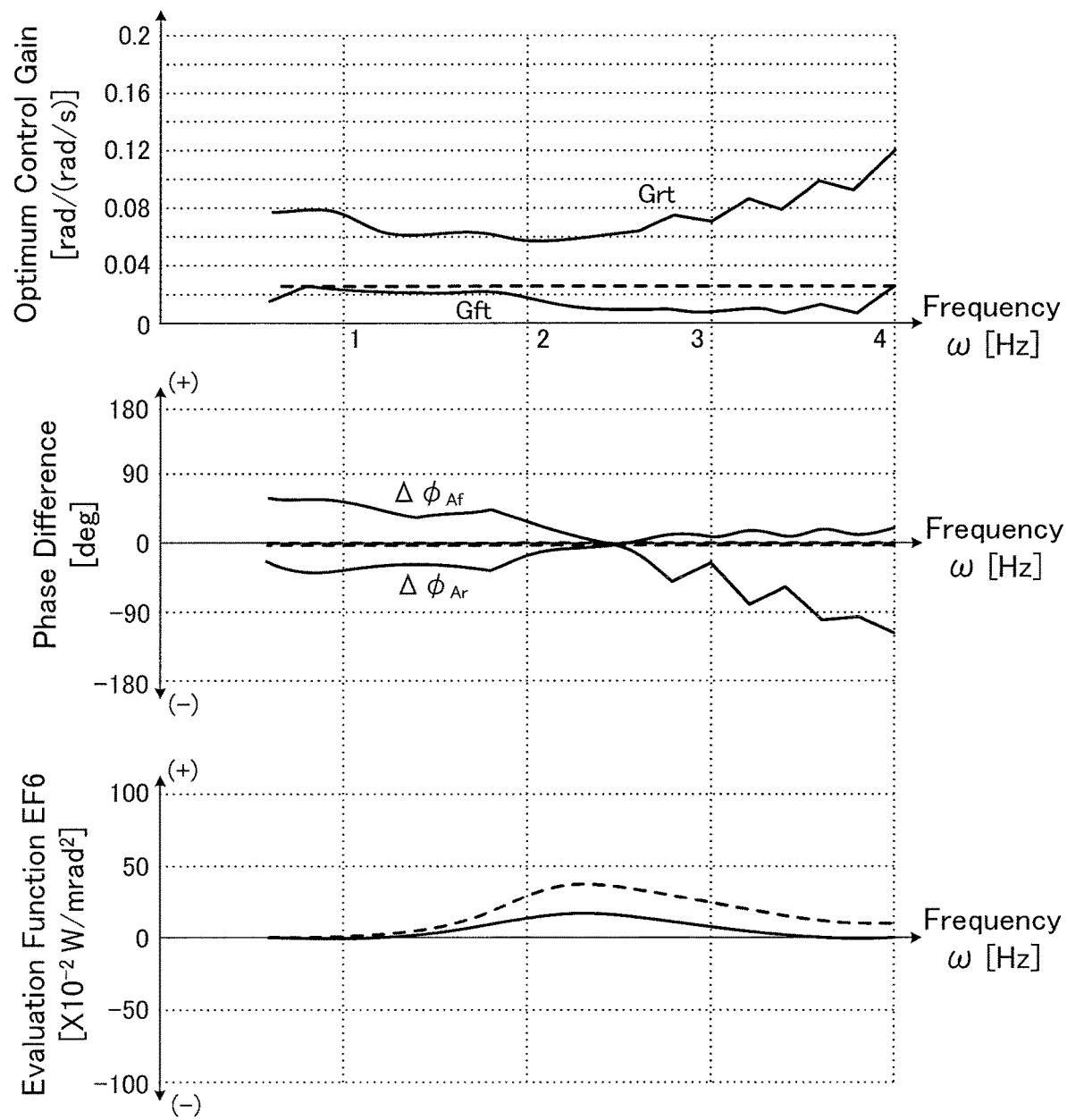
FIG. 22 shows graphs showing a relationship between a frequency $\omega$ of a roll angle $\varphi$ and optimum control gains Gft and Grt (upper part), a relationship between a frequency $\omega$ of a roll angle $\varphi$ and phase differences between rotation angles $\Delta\varphi_{Af}$ and $\Delta\varphi_{Ar}$ of the front wheel and rear wheel side actuators with respect to a roll angular velocity $\varphi d$ of the vehicle body at the time of optimum control (middle part), and a relationship between a frequency $\omega$ of a roll angle $\varphi$ and an evaluation function EF6 (larger one of the average powers) at the time of optimum control (lower part), in the sixth embodiment.

The upper, the middle and the lower parts in FIG. 22 correspond to the upper, the middle and the lower parts in FIG. 7, respectively. In particular, the lower part in FIG. 22 shows a relationship between a frequency ω of a roll angle φ and the evaluation function (a larger one of the average powers) EF6 at the time of optimum control in the vehicle speed range of 90 to 100 km/h together with a relationship (broken line) in the prior art. From the lower part in FIG. 22, it is seen that the evaluation function EF6 at the time of optimum control is lower than that in the prior art except for the range where the frequency ω of the roll angle φ is low.

The relationship between a frequency ω of a roll angle φ and optimum control gains Gft and Grt is shown only for the above-mentioned vehicle speed range in the upper part in FIG. 22, but differs depending on a vehicle speed range. Although not shown in the figure, as in the first to fifth embodiments, as a vehicle speed V decreases, the optimum control gain Gft increases and the optimum control gain Grt decreases. The ROM of the electronic control unit 14 stores the relationships between a frequency ω and optimum control gains Gft and Grt for a plurality of vehicle speed ranges divided at intervals of 10 km/h as maps.

Also in the sixth embodiment, the roll control is performed in the same manner as in the first embodiment according to the flowchart shown in FIG. 2. However, in the step 40 in the sixth embodiment, a vehicle speed range to which a vehicle speed V belongs is specified and a map for the specified vehicle speed range is specified from a plurality of maps (the upper part in FIG. 22) showing the relationships between a frequency ω and optimum control gains Gft and Grt.

Figure 23:
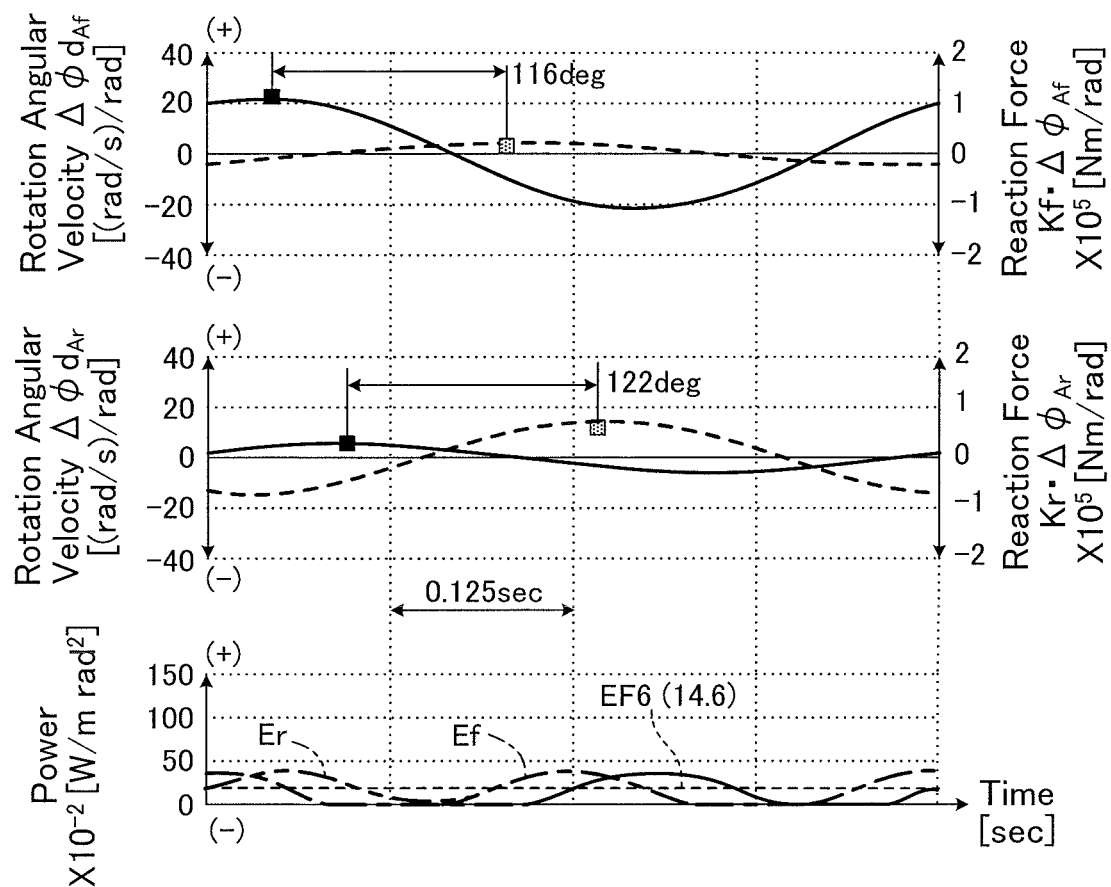
FIG. 23 shows graphs showing performance of the sixth embodiment.
Figure 24:
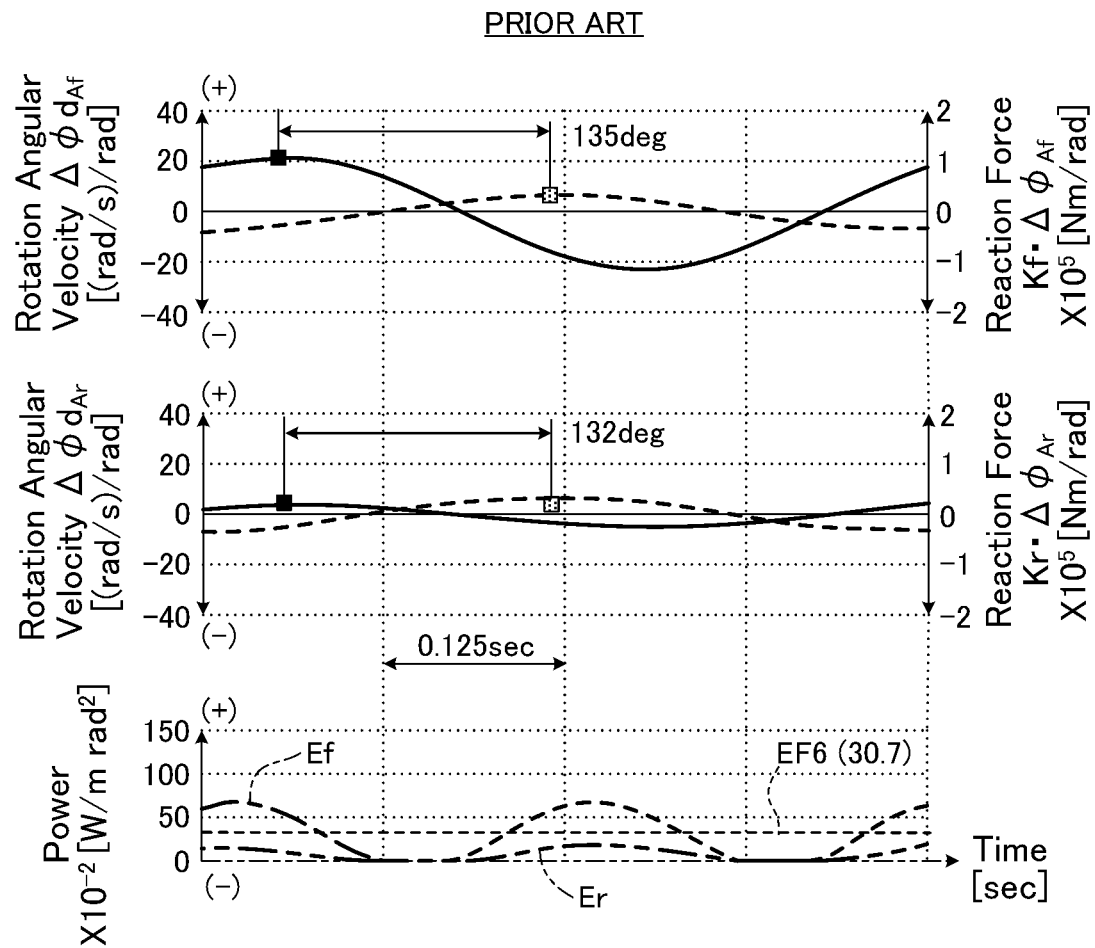
FIG. 24 shows graphs showing performance of the prior art corresponding to FIG. 23.

FIGS. 23 and 24 are graphs showing the performance of the sixth embodiment and the prior art with respect to the case where a vehicle speed V is 100 km/h and a roll frequency ω of the vehicle body is 2 Hz, and correspond to FIGS. 8 and 9, respectively. In particular, the thin dashed line in the lower part shows a larger one of the average powers (evaluation function EF6) of the front wheel side and rear wheel side active stabilizer devices 12f and 12r.

As shown in the upper parts in FIGS. 23 and 24, a phase difference between a reaction force of the front wheel side active stabilizer device and a rotational angular velocity of the actuator in the prior art is 135 degrees, while a phase difference in the sixth embodiment is 116 degrees. As shown in the middle parts in FIGS. 23 and 24, a phase difference between a reaction force of the rear wheel side active stabilizer device and a rotational angular velocity of the actuator in the prior art is 132 degrees, while a phase difference in the sixth embodiment is 122 degrees. Therefore, the phase difference of the reaction force of the active stabilizer device and the rotational angular velocity of the actuator in the sixth embodiment are smaller than the same phase difference in the prior art for both the front wheel side and the rear wheel side.

As shown in the lower parts in FIGS. 23 and 24, a larger one of the average powers EF6 in the prior art is $30.7 \times 10^{-2}$ W/mrad$^2$ while a larger one of the average powers EF6 in the sixth embodiment is $14.6 \times 10^{-2}$ W/mrad$^2$. Even when a vehicle speed range is the vehicle speed range other than 90 to 100 km/h, a larger one of the average powers EF6 of the front wheel side and rear wheel side active stabilizer devices 12*f* and 12*r* can be reduced as compared with the prior art. Therefore, according to the sixth embodiment, as in the fifth embodiment, it is possible to decrease a larger one of average powers of the front wheel side and rear wheel side active stabilizer devices so as to reduce a risk of thermal damage to the actuators.

In particular, from the comparison between the fifth and sixth embodiments, it is seen that an amount by which a larger one of the average powers of the front wheel side and rear wheel side active stabilizer devices can be reduced as compared with the prior art is larger when the regeneration by the electric motors is performed than that when the regeneration by the electric motors is not performed.

Seventh Embodiment

In the seventh embodiment, gains Gf and Gr of rotation angles $\Delta\varphi_{Af}$ and $\Delta\varphi_{Ar}$ of the actuators 104Af and 104Ar with respect to the roll angular velocity φd of the vehicle body when the evaluation function EF7 becomes minimum for various frequencies ω for each of a plurality of vehicle speed ranges partitioned every 10 km/h, are obtained in advance by simulation as optimum control gains Gft and Grt, respectively. The specification of the vehicle used for the simulation is the same as the specification of the first embodiment. In the following description of the seventh embodiment, "the control when the evaluation function EF7 becomes minimum" is expressed as "optimal control".

Figure 25:
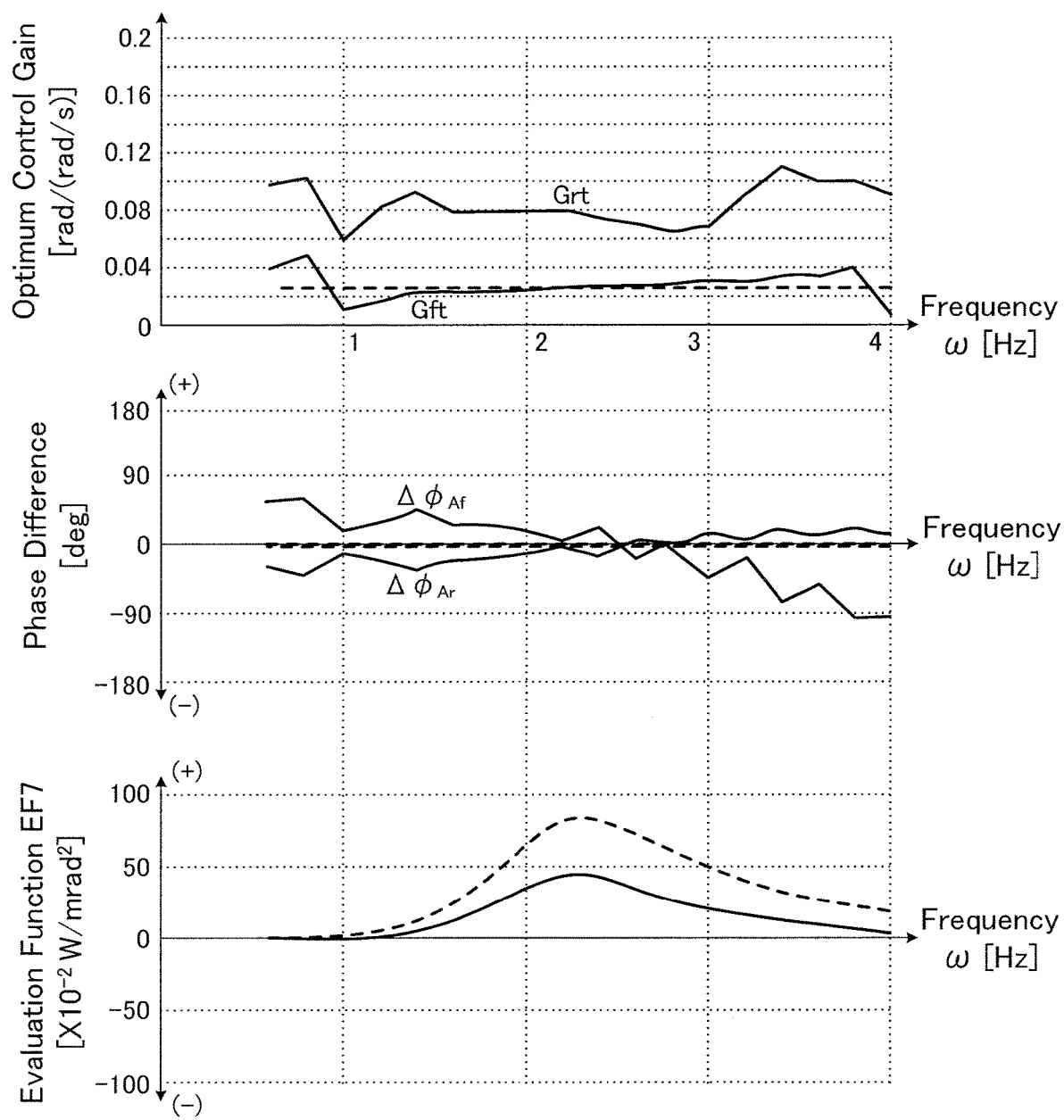
FIG. 25 shows graphs showing a relationship between a frequency $\omega$ of a roll angle $\varphi$ and optimum control gains Gft and Grt (upper part), a relationship between a frequency $\omega$ of a roll angle $\varphi$ and phase differences between rotation angles $\Delta\varphi_{Af}$ and $\Delta\varphi_{Ar}$ of the front wheel and rear wheel side actuators with respect to a roll angular velocity $\varphi d$ of the vehicle body at the time of optimum control (middle part), and a relationship between a frequency $\omega$ of a roll angle $\varphi$ and an evaluation function EF7 (instantaneous maximum power based on a larger one of the average powers) at the time of optimum control (lower part), in the sixth embodiment.

The upper, the middle and the lower parts in FIG. 25 correspond to the upper, the middle and the lower parts in FIG. 7, respectively. In particular, the lower part in FIG. 25 shows a relationship between a frequency ω of a roll angle φ and the evaluation function EF7 (instantaneous maximum power based on a larger one of the average powers) at the time of optimum control in the vehicle speed range of 90 to 100 km/h together with a relationship (broken line) in the prior art. From the lower part in FIG. 25, it is seen that the evaluation function EF7 at the time of optimum control is lower than that in the prior art except for the range where the frequency ω of the roll angle φ is low.

The relationship between a frequency ω of a roll angle go and optimum control gains Gft and Grt is shown only for the above-mentioned vehicle speed range in the upper part in FIG. 25, but differs depending on a vehicle speed range. Although not shown in the figure, as in the first to sixth embodiments, as a vehicle speed V decreases, the optimum control gain Gft increases and the optimum control gain Grt decreases. The ROM of the electronic control unit 14 stores the relationships between a frequency ω and optimum control gains Gft and Grt for a plurality of vehicle speed ranges divided at intervals of 10 km/h as maps.

Also in the seventh embodiment, the roll control is performed in the same manner as in the first embodiment according to the flowchart shown in FIG. 2. However, in the step 40 in the seventh embodiment, a vehicle speed range to which a vehicle speed V belongs is specified and a map for the specified vehicle speed range is specified from a plurality of maps (the upper part in FIG. 25) showing the relationships between a frequency ω and optimum control gains Gft and Grt.

Figure 26:
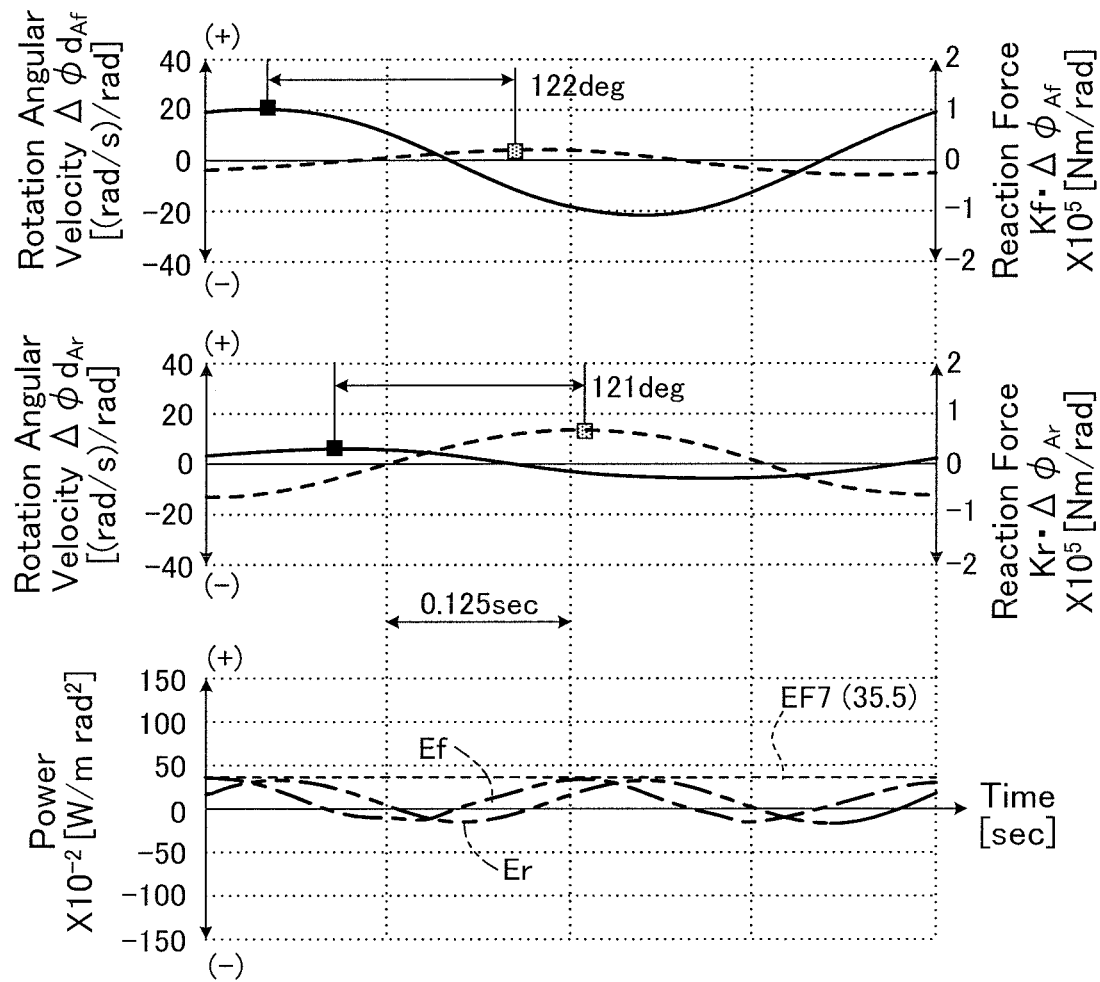
FIG. 26 shows graphs showing performance of the seventh embodiment.
Figure 27:
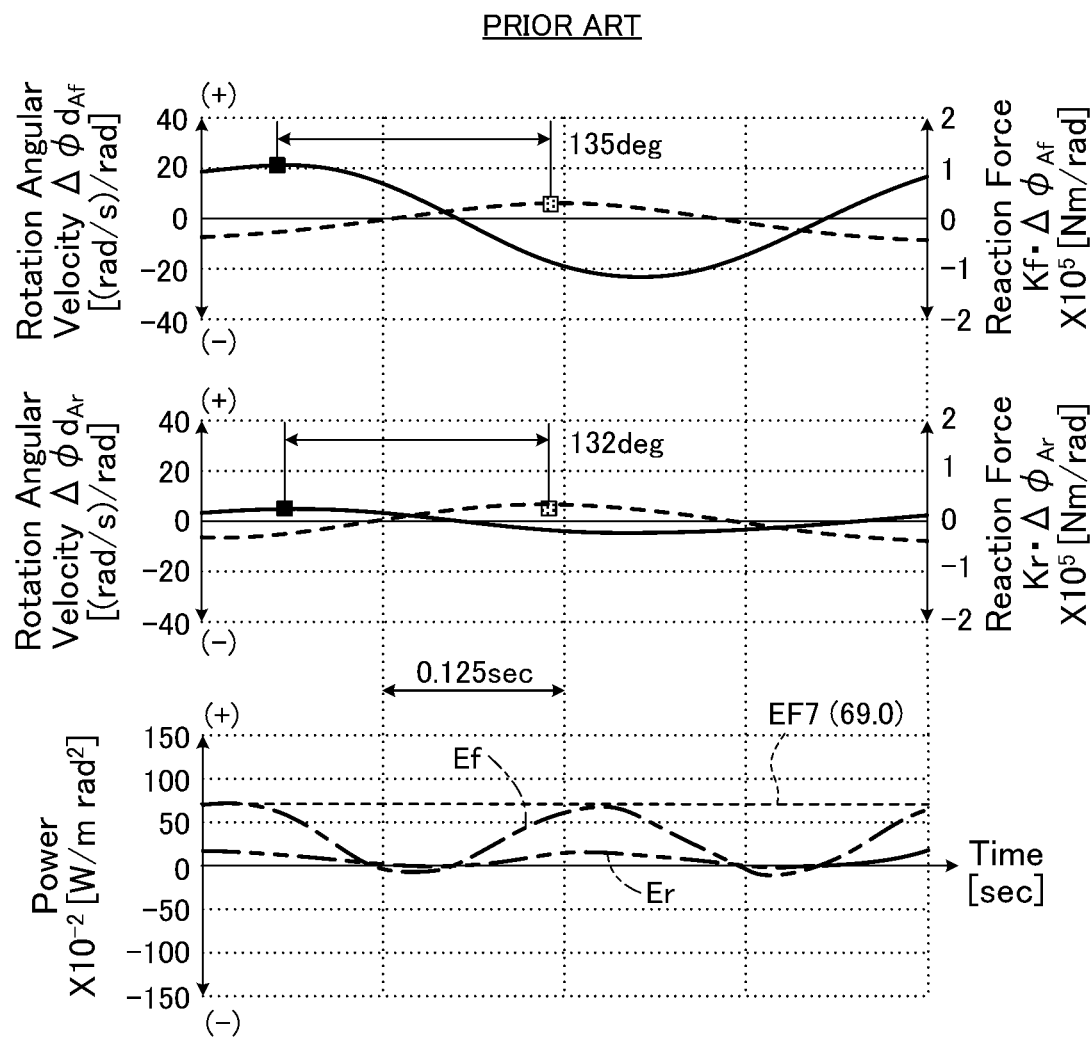
FIG. 27 shows graphs showing performance of the prior art corresponding to FIG. 26.

FIGS. 26 and 27 are graphs showing the performance of the seventh embodiment and the prior art with respect to the case where a vehicle speed V is 100 km/h and a roll frequency ω of the vehicle body is 2 Hz, and correspond to FIGS. 8 and 9, respectively. In particular, the thin dashed line in the lower part shows an instantaneous maximum power based on a larger one of the average powers (the evaluation function EF7) of the front wheel side and rear wheel side active stabilizer devices 12*f* and 12*r*.

As shown in the upper parts in FIGS. 26 and 27, a phase difference between a reaction force of the front wheel side active stabilizer device and a rotational angular velocity of the actuator in the prior art is 135 degrees, while a phase difference in the seventh embodiment is 122 degrees. As shown in the middle parts in FIGS. 26 and 27, a phase difference between a reaction force of the rear wheel side active stabilizer device and a rotational angular velocity of the actuator in the prior art is 132 degrees, while a phase difference in the seventh embodiment is 121 degrees. Therefore, the phase difference of the reaction force of the active stabilizer device and the rotational angular velocity of the actuator in the seventh embodiment are smaller than the same phase difference in the prior art for both the front wheel side and the rear wheel side.

As shown in the lower parts in FIGS. 26 and 27, an instantaneous maximum power based on a larger one of the average powers EF7 in the prior art is $69.0 \times 10^{-2}$ W/mrad$^2$ while an instantaneous maximum power based on a larger one of the average powers EF7 in the seventh embodiment is $35.5 \times 10^{-2}$ W/mrad$^2$. Even when the vehicle speed range is a vehicle speed range other than 90 to 100 km/h, a larger one of the average powers EF7 of the front wheel side and rear wheel side active stabilizer devices 12*f* and 12*r* can be reduced as compared with the prior art. Therefore, according to the seventh embodiment, it is possible to reduce a peak value of energy consumption of the front wheel side and rear wheel side active stabilizer devices as compared with the prior art.

Eighth Embodiment

In the eighth embodiment, gains Gf and Gr of rotation angles $\Delta\varphi_{Af}$ and $\Delta\varphi_{Ar}$ of the actuators 104Af and 104Ar with respect to the roll angular velocity φd of the vehicle body when the evaluation function EF8 becomes minimum for various frequencies ω for each of a plurality of vehicle speed ranges partitioned every 10 km/h, are obtained in advance by simulation as optimum control gains Gft and Grt, respectively. The specification of the vehicle used for the simulation is the same as the specification of the first embodiment. In the following description of the eighth embodiment, "the control when the evaluation function EF8 becomes minimum" is expressed as "optimal control".

In the eighth embodiment, the graphs corresponding to the upper part, the middle part and the lower part in FIG. 7 are the same as the graphs of the upper part, the middle part and the lower part in FIG. 25 in the above seventh embodiment. Therefore, illustration of graphs corresponding to the upper part, the middle part and the lower part in FIG. 7 is omitted. The ROM of the electronic control unit 14 stores relationships between a frequency ω and optimum control gains Gft and Grt for a plurality of vehicle speed ranges divided at intervals of 10 km/h as maps.

Also in the eighth embodiment, the roll control is performed in the same manner as in the first embodiment according to the flowchart shown in FIG. 2. However, in the step 40 in the eighth embodiment, a vehicle speed range to which a vehicle speed V belongs is specified and a map for the specified vehicle speed range is specified from a plurality of maps (the upper part in FIG. 25) showing the relationships between a frequency ω and optimum control gains Gft and Grt.

Figure 28:
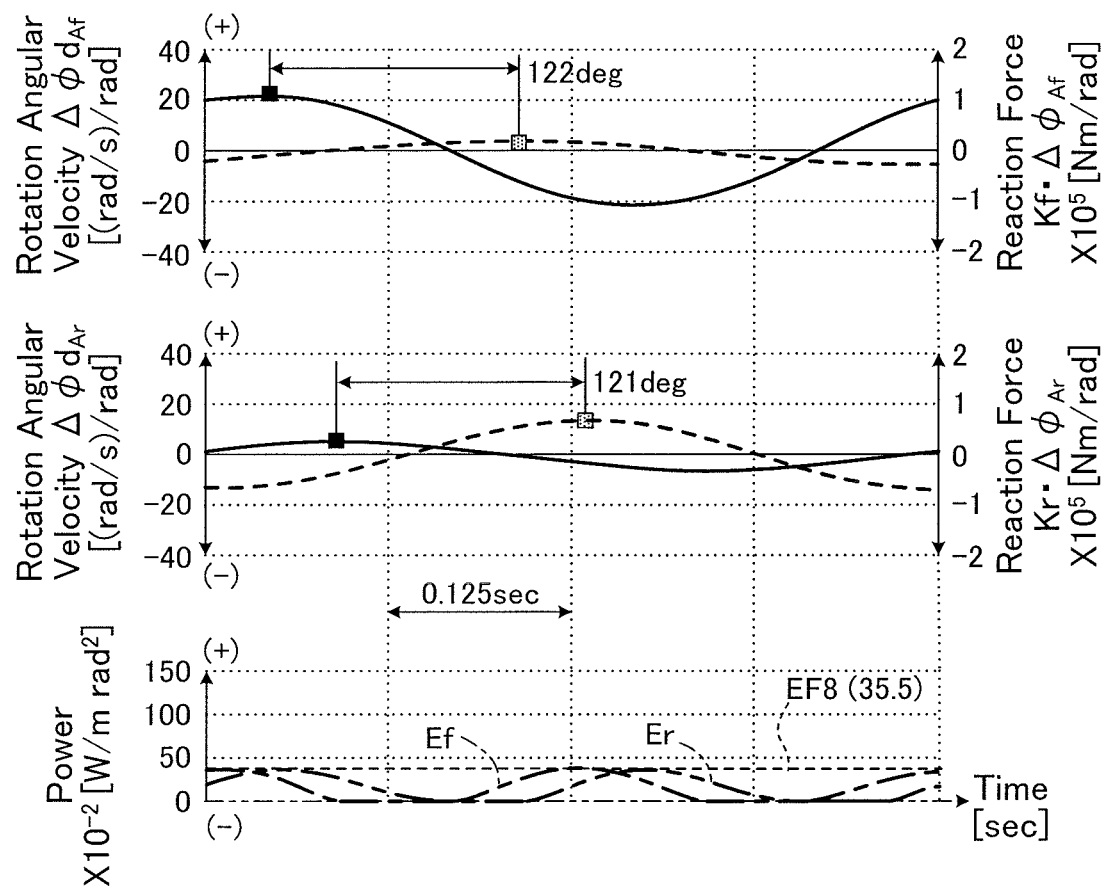
FIG. 28 shows graphs showing performance of the eighth embodiment.
Figure 29:
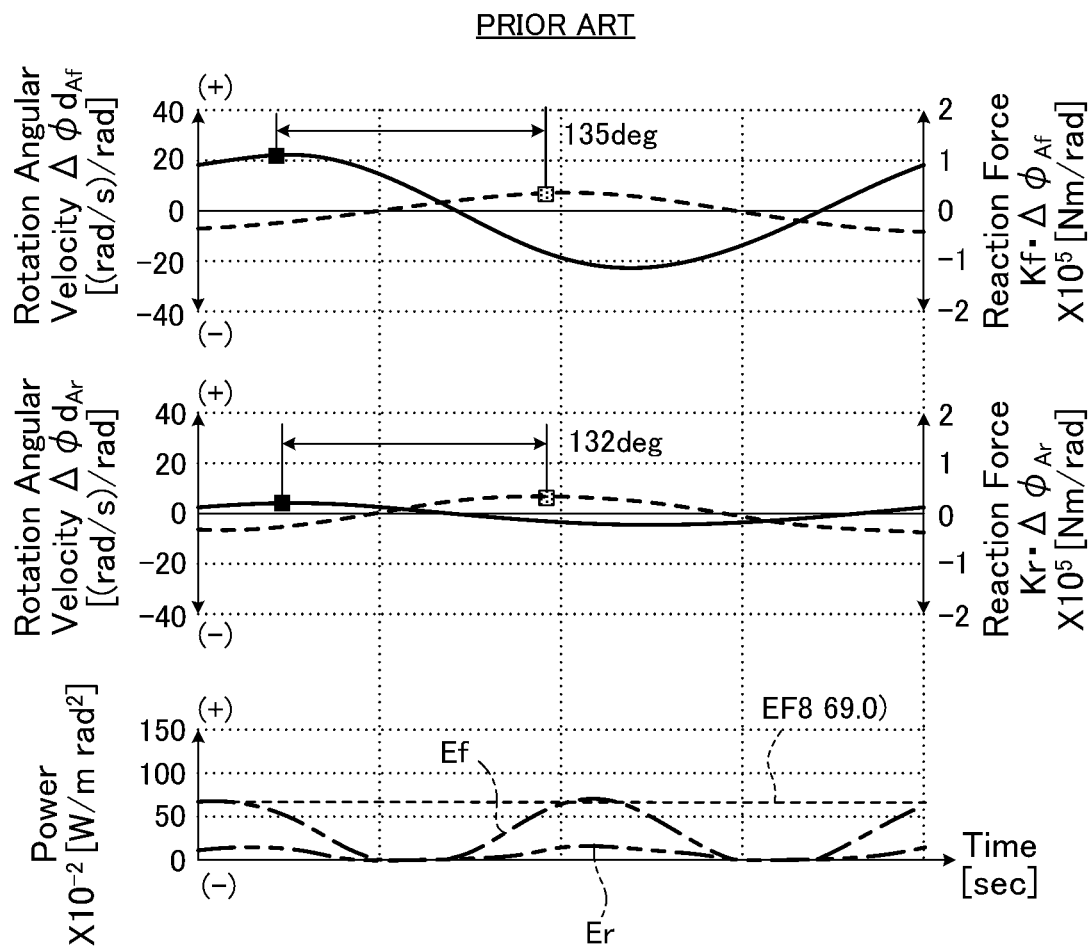
FIG. 29 shows graphs showing performance of the prior art corresponding to FIG. 28.

FIGS. 28 and 29 are graphs showing the performance of the eighth embodiment and the prior art with respect to the case where a vehicle speed V is 100 km/h and a roll frequency ω of the vehicle body is 2 Hz, and correspond to FIGS. 8 and 9, respectively. In particular, the thin dashed line in the lower part shows an instantaneous maximum power based on a larger one of the average powers (evaluation function EF8) of the front wheel side and rear wheel side active stabilizer devices 12$f$ and 12$r$.

The graphs shown in the upper and middle parts in FIGS. 28 and 29 are the same as the graphs shown in the upper and middle parts in FIGS. 26 and 27, respectively, Therefore, the phase difference of the reaction force of the active stabilizer device and the rotational angular velocity of the actuator in the eighth embodiment are smaller than the same phase difference in the prior art for both the front wheel side and the rear wheel side.

As shown in the lower parts in FIGS. 28 and 29, an instantaneous maximum power based on a larger one of the average powers EF8 in the prior art is $69.0 \times 10^{-2}$ W/mrad² while an instantaneous maximum power based on a larger one of the average powers EF8 in the eighth embodiment is $35.5 \times 10^{-2}$ W/mrad². Even when the vehicle speed range is a vehicle speed range other than 90 to 100 km/h, an instantaneous maximum power based on a larger one of the average powers EF8 of the front wheel side and rear wheel side active stabilizer devices 12$f$ and 12$r$ can be reduced as compared with the prior art. Therefore, according to the eighth embodiment, as in the seventh embodiment, it is possible to reduce a larger one of peak values of energy consumption of the front wheel side and rear wheel side active stabilizer devices as compared with the prior art.

Further, from the comparison between the seventh and eighth embodiments, it is seen that an amount by which a larger one of peak values of energy consumption of the front wheel side and rear wheel side active stabilizer devices is the same whether regeneration by the electric motors is performed or regeneration by the electric motors is not performed.

According to the above-described first to eighth embodiments, since a sum $Kf \cdot \Delta\varphi_{Af} + Kr \cdot \Delta\varphi_{Ar}$ of anti-roll moments generated by the front wheel side and rear wheel side active stabilizer devices is controlled to be a target anti-roll moment Mart, a roll angle of the vehicle body can effectively be reduced.

Although the present disclosure has been described in detail with reference to specific embodiments, it will be apparent to those skilled in the art that the present disclosure is not limited to the above-described embodiments, and various other embodiments are possible within the scope of the present disclosure.

For example, in the above-described embodiments, vertical accelerations GzL and GzR of the vehicle body 16B are detected by the vertical acceleration sensors 34L and 34R and a difference GzR-GzL between the vertical accelerations Gzr and GzL is integrated to calculate a roll angular velocity φd of the vehicle body. However, a roll angular velocity φd of the vehicle body may be detected by a roll angular velocity sensor or vehicle heights at left and right wheel positions may be detected and may be calculated as a differential value of the difference therebetween.

In the above-described embodiments, optimum control gains Gft and Grt of rotation angles $\Delta\varphi_{Af}$ and $\Delta\varphi_{Ar}$ of the actuators with respect to a roll angular velocity φd of the vehicle body are previously obtained by simulation, but these gains may be experimentally obtained.

In the above-described embodiments, relationships between a frequency ω and optimum control gains Gft and Grt are stored as maps for a plurality of vehicle speed ranges divided every 10 km/h. However, the classification of vehicle speed range does not have to be every 10 km/h. Relationships between a frequency ω and optimum control gains Gft and Grt are stored as maps for a plurality of predetermined vehicle speeds V. When a vehicle speed V is not the predetermined vehicle speed, optimum control gains Gft and Grt may calculated by a complementary calculation using the maps.

Further, in the above-described embodiments, the arm portions 12ALf and 12ARf of the front wheel side active stabilizer device 12$f$ are positioned behind the bars 12BLf and 12BRf, respectively with respect to the vehicle. Similarly, the arm portions 12ALr and 12ARr of the rear wheel side active stabilizer device 12$r$ are positioned behind the bars 12BLr and 12BRr, respectively with respect to the vehicle. However, the left and right arm portions of at least one of the front wheel side and rear wheel side active stabilizer devices 12$f$ and 12$r$ may be positioned in front of the corresponding bars with respect to the vehicle.

What is claimed is:

1. A roll control apparatus for a vehicle which comprises a front wheel side active stabilizer device, a rear wheel side active stabilizer device, and a control unit that controls the front wheel side and rear wheel side active stabilizer devices; each of the active stabilizer devices includes left and right stabilizers each including a bar extending in a lateral direction of the vehicle and an arm portion integrally formed with the bar and extending in a direction crossing the bar, and an electric actuator configured to rotate the bars of the right and left stabilizers relative to each other; the control unit is configured to calculate a target anti-roll moment for reducing a roll angle of a vehicle body based on a product of a roll angular velocity of the vehicle body and a control coefficient, and to control the front wheel side and rear wheel side electric actuators so that a sum of anti-roll moments generated by the front wheel side and rear wheel side active stabilizer devices becomes the target anti-roll moment, wherein the control unit stores a relationship between particular control gains of the front wheel side and rear wheel side electric actuators for minimizing an evaluation function based on powers of the front wheel side and rear wheel side active stabilizer devices, a vehicle speed and a frequency of a roll angle change of the vehicle body, the powers of the front wheel side and rear wheel side active stabilizer devices being evaluated as products of rotational angular velocities of the front wheel side and rear wheel side electric actuators and stabilizer reaction forces generated by elastic deformation of the corresponding arm portions, and wherein the control unit is configured to determine particular control gains of the front wheel side and rear wheel side electric actuators from the stored relationship on the basis of a vehicle speed and a frequency of a roll angle change of the vehicle body, and to control the front wheel side and rear wheel side electric actuators so that control gains of the front wheel side and rear wheel side electric actuators become the determined corresponding particular control gains.

2. The roll control apparatus for a vehicle according to claim 1, wherein the evaluation function is an average power based on a sum of powers of the front wheel side and rear wheel side active stabilizer devices.

3. The roll control apparatus for a vehicle according to claim 1, wherein the evaluation function is a maximum value of a sum of powers of the front wheel side and rear wheel side active stabilizer devices.

4. The roll control apparatus for a vehicle according to claim 1, wherein the evaluation function is a larger value of average powers of the front wheel side and rear wheel side active stabilizer devices.

5. The roll control apparatus for a vehicle according to claim 1, wherein the evaluation function is a larger value of maximum values of the powers of the front wheel side and rear wheel side active stabilizer devices.

6. The roll control apparatus for a vehicle according to claim 1, wherein the control unit is configured to perform regeneration to recover generated energy in a situation where an actuator is rotated by a roll of the vehicle to generate electricity, and to set a power of the corresponding active stabilizer device to a negative value when performing regeneration.

7. The roll control apparatus for a vehicle according to claim 1, wherein the control unit is configured not to recover the generated energy even in a situation where an actuator is rotated by a roll of the vehicle to generate electricity, and to set a power of the stabilizer device to zero in a situation where the actuator is rotated by a roll of the vehicle.

\* \* \* \* \*